US011708052B2

(12) United States Patent
Yamauchi et al.

(10) Patent No.: US 11,708,052 B2
(45) Date of Patent: Jul. 25, 2023

(54) VEHICLE CLEANING SYSTEM

(71) Applicant: DENSO CORPORATION, Kariya (JP)

(72) Inventors: Yuusuke Yamauchi, Kariya (JP);
Masaaki Kiyama, Kariya (JP);
Yasuhiro Harita, Kariya (JP)

(73) Assignee: DENSO CORPORATION, Kariya (JP)

( * ) Notice: Subject to any disclaimer, the term of this patent is extended or adjusted under 35 U.S.C. 154(b) by 103 days.

(21) Appl. No.: 16/629,352

(22) PCT Filed: Jul. 6, 2018

(86) PCT No.: PCT/JP2018/025778
§ 371 (c)(1),
(2) Date: Jan. 8, 2020

(87) PCT Pub. No.: WO2019/013138
PCT Pub. Date: Jan. 17, 2019

(65) Prior Publication Data
US 2020/0139936 A1    May 7, 2020

(30) Foreign Application Priority Data

Jul. 11, 2017  (JP) .............................. JP2017-135736

(51) Int. Cl.
*B60S 1/08* (2006.01)
*B60S 1/36* (2006.01)
(Continued)

(52) U.S. Cl.
CPC .............. *B60S 1/0822* (2013.01); *B60S 1/36* (2013.01); *B60S 1/485* (2013.01); *B60W 50/14* (2013.01); *B60W 2050/143* (2013.01)

(58) Field of Classification Search
CPC .... B60S 1/0818; B60S 1/0822; B60S 1/0807; B60S 1/36; B60S 1/365; B60S 1/485;
(Continued)

(56) References Cited

U.S. PATENT DOCUMENTS 4,355,271 A    10/1982  Noack
4,595,866 A  *  6/1986  Fukatsu ................. B60S 1/485
                                          15/DIG. 15
(Continued)

FOREIGN PATENT DOCUMENTS

CN    103359070 A    10/2013
JP    S55-66738 A    5/1980
(Continued)

OTHER PUBLICATIONS

Translation of WO-2017122825-A1 retrieved from Espacenet on Sep. 10, 2021 (Year: 2017).*
(Continued)

*Primary Examiner* — Thomas Raymond Rodgers
(74) *Attorney, Agent, or Firm* — Oliff PLC

(57) ABSTRACT

A vehicle cleaning system is provided including a foreign object detection section configured to detect a foreign object present on a windshield, a foreign object removal device configured to clean the windshield to remove the foreign object, an actuation notification section configured to notify a user of actuation of the foreign object removal device, and a control section that, when the foreign object detection section has detected the foreign object, controls the actuation notification section so as to notify of actuation of the foreign object removal device before controlling the foreign object removal device so as to clean the windshield.

8 Claims, 17 Drawing Sheets

(51) Int. Cl.
  *B60S 1/48* (2006.01)
  *B60W 50/14* (2020.01)
(58) Field of Classification Search
  CPC ......... B60S 1/522; B60S 1/482; B60W 50/14;
                                              B60W 2050/143
  USPC .............. 15/250.01, 250.02, 250.04, 250.12,
              15/250.21; 318/483, 445, 482, 443, 444
  See application file for complete search history.

(56) References Cited

U.S. PATENT DOCUMENTS

| | | | |
|---|---|---|---|
| 2013/0255024 A1 | 10/2013 | Kaminaga et al. | |
| 2017/0225659 A1* | 8/2017 | Kobori | H02P 3/06 |
| 2018/0068552 A1* | 3/2018 | Alarcon | B60K 35/00 |
| 2018/0370496 A1* | 12/2018 | Sykula | B60S 1/0818 |

FOREIGN PATENT DOCUMENTS

| | | |
|---|---|---|
| JP | S59-171741 A | 9/1984 |
| JP | S60-149984 A | 8/1985 |
| JP | H07-32978 A | 2/1995 |
| JP | H8-119068 A | 5/1996 |
| JP | H10-143643 A | 5/1998 |
| JP | 2000-230985 A | 8/2000 |
| JP | 2007-55562 A | 3/2007 |
| JP | 2013-067186 A | 4/2013 |
| JP | 2013-208992 A | 10/2013 |
| JP | 2014-026049 A | 2/2014 |
| JP | 2015-123877 A | 7/2015 |
| JP | 2017-7648 A | 1/2017 |
| WO | WO-2017122825 A1 * | 7/2017 ................ B60S 1/24 |

OTHER PUBLICATIONS

Translation of JPH0732978A, retrieved from Espacenet on Sep. 10, 2021 (Year: 1995).*

Sep. 18, 2018 International Search Report issued in International Patent Application No. PCT/JP2018/025778.

* cited by examiner

VEHICLE CLEANING SYSTEM

TECHNICAL FIELD

The present disclosure relates to a vehicle cleaning system.

BACKGROUND ART

A vehicle cleaning system cleans a windshield glass (windshield) of a vehicle by spraying washer fluid onto the windshield glass and wiping the windshield glass with a wiper blade. If the driver of the vehicle is bothered by dirt on the surface of the windshield glass, the driver operates a washer switch provided close to a wiper switch used to actuate a wiper device to spray washer fluid and wipe the surface of the windshield glass with the wiper blade.

Recently, on-board cameras are often installed for image capture ahead of the vehicle through the windshield glass in order for the vehicle to perform automated driving or advanced driver-assistance. Infrared sensors such as rain sensors to detect water droplets on the surface of the windshield glass are also being installed more frequently. If the surface of the windshield glass becomes dirty, such on-board cameras and infrared sensors related to automated driving or advanced driver-assistance by the vehicle struggle to acquire information necessary for this automated driving or advanced driver-assistance.

Japanese Patent Application Laid-Open (JP-A) No. 2014-026049 discloses a cleaning device that detects a foreign object adhering to an optical image capture system and automatically removes the foreign object with blown air.

SUMMARY OF INVENTION

Technical Problem

However, the technology disclosed in JP-A No. 2014-026049 cleans with blown air without informing users, including the driver and other occupants, in advance. Evaluation of such a vehicle cleaning system reveals that users might feel unease due to the action of the vehicle cleaning system.

In consideration of the above circumstances, the present disclosure provides a vehicle cleaning system capable of automatically cleaning a windshield glass when dirt has been detected on the windshield glass while suppressing user unease.

Solution to Problem

A first aspect of the present disclosure is a vehicle cleaning system including a foreign object detection section configured to detect a foreign object present on a windshield, a foreign object removal device configured to clean the windshield to remove the foreign object, an actuation notification section configured to notify a user of actuation of the foreign object removal device, and a control section that, when the foreign object detection section has detected the foreign object, controls the actuation notification section so as to notify of actuation of the foreign object removal device before controlling the foreign object removal device so as to clean the windshield.

In the first aspect, the user is notified that the foreign object removal device is to be actuated when dirt has been detected on the windshield, thereby enabling user unease due to automatic cleaning of the windshield to be suppressed.

A vehicle cleaning system of a second aspect of the present disclosure is the first aspect, wherein the foreign object detection section includes an imaging section configured to acquire information about an image ahead of a vehicle through the windshield from inside a vehicle cabin. The control section determines that the foreign object detection section has detected a foreign object in a case in which a difference between a minimum pixel brightness value and a maximum pixel brightness value of pixels, of which a predetermined pixel quantity or greater exist within image data acquired by the imaging section, is a predetermined value or greater.

In the second aspect, in cases in which a foreign object has been determined to be present on the windshield based on the image data acquired by the imaging section, the user is notified that the foreign object removal device is to be actuated, thereby enabling user unease due to automatic cleaning of the windshield to be suppressed.

A vehicle cleaning system of a third aspect of the present disclosure is the first or the second aspect, wherein the foreign object detection section further includes an infrared sensor configured to detect a water droplet on a surface of the windshield, and the control section determines that the foreign object detection section has detected a foreign object in a case in which the infrared sensor has detected a water droplet.

In the third aspect, in cases in which a foreign object has been determined to be present on the windshield based on a detection result of the infrared sensor, the user is notified that the foreign object removal device is to be actuated, thereby enabling user unease due to automatic cleaning of the windshield to be suppressed.

A vehicle cleaning system of a fourth aspect of the present disclosure is any one of the first to the third aspects, wherein the actuation notification section includes a visual information display section including either a display section or a warning light configured to notify a user of actuation of the foreign object removal device using visual information, an audio output section configured to notify a user of actuation of the foreign object removal device using audio information including either an announcement or a warning sound, and a vibration generation section configured to notify a user of actuation of the foreign object removal device using vibration.

In the fourth aspect, the user is notified that the foreign object removal device is to be actuated in a visual, audible, and sensory manner, thereby enabling user unease due to automatic cleaning of the windshield to be suppressed.

A vehicle cleaning system of a fifth aspect of the present disclosure is any one of the first to the fourth aspects, further including a selection section configured to enable a user to select either to permit actuation of the foreign object removal device or cancel actuation of the foreign object removal device.

In the fifth aspect, actuation of the foreign object removal device can be forbidden under the discretion of the user, thereby enabling user unease due to automatic cleaning of the windshield to be suppressed.

A vehicle cleaning system of a sixth aspect of the present disclosure is any one of the first to the fifth aspects, wherein the foreign object removal device includes a washer device configured to spray cleaning fluid toward the windshield, and a wiper device configured to wipe cleaning fluid adhering to the windshield with a wiper blade.

In the sixth aspect, in cases in which a foreign object has been detected on the windshield, the surface of the windshield can be cleaned by the washer device and the wiper device.

A vehicle cleaning system of a seventh aspect of the present disclosure is the sixth aspect, wherein the washer device includes a detection range nozzle configured to spray cleaning fluid toward a detection range in which the foreign object detection section detects a foreign object.

In the seventh aspect, functionality of the imaging section and the infrared sensor can be secured by the detection range nozzle that sprays cleaning fluid toward the detection range in which the foreign object removal device detects a foreign object.

A vehicle cleaning system of an eighth aspect of the present disclosure is the sixth aspect, wherein cleaning fluid-spraying nozzles of the washer device are respectively provided at a side facing toward an upper return position and at a side facing toward a lower return position on at least one of the wiper blade or a wiper arm that causes the wiper blade to perform a wiping action. The control section controls to spray cleaning fluid from the nozzle provided at the side facing toward the upper return position during a wiping action of the wiper blade toward the upper return position, and controls to spray cleaning fluid from the nozzle provided at the side facing toward the lower return position during a wiping action of the wiper blade toward the lower return position.

In wiper device of the eighth aspect, cleaning fluid is sprayed ahead of the direction of progress of the wiper blade from the respective spray nozzles provided to the wiper blade or the wiper arm, such that the sprayed cleaning fluid can be wiped promptly by the wiper blade, thereby enabling the surface of the windshield including the detection range to be cleaned quickly.

A vehicle cleaning system of a ninth aspect of the present disclosure is any one of the sixth to the eighth aspects, wherein the wiper device includes a first drive source configured to swing a wiper arm such that the wiper blade coupled to a leading end portion of the wiper arm wipes the windshield, a second drive source configured to use an extension-contraction mechanism provided to the wiper arm to change a wiping range of the wiper blade, and a control section configured to control the first drive source and the second drive source to perform an extension or contraction action of the wiper arm using the extension-contraction mechanism so as to correspond to a swinging action of the wiper arm.

In the ninth aspect, the second drive source is controlled in synchronization with the first drive source. This control enables the extension-contraction mechanism of the wiper arm to be extended or contracted so as to correspond to the swinging action of the wiper arm, enables the wiping range of the windshield by the wiper blade to be changed, and enables the detection range to be reliably cleaned.

DESCRIPTION OF EMBODIMENTS

First Exemplary Embodiment

Figure 1:
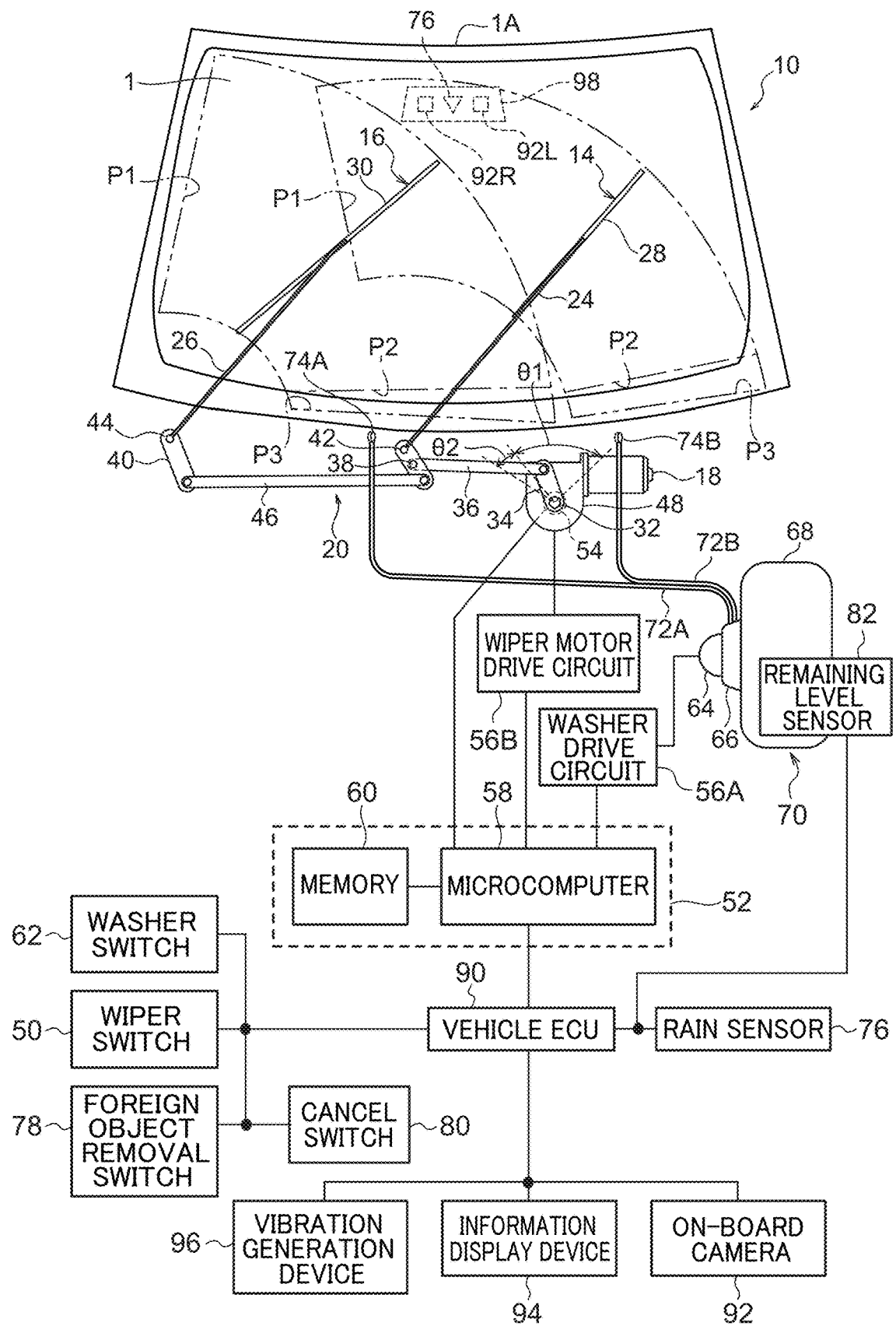
FIG. 1 is a schematic diagram illustrating configuration of a vehicle cleaning system according to a first exemplary embodiment of the present disclosure.

FIG. 1 is a schematic diagram illustrating a configuration of a vehicle cleaning system 10 according to an exemplary embodiment. The vehicle cleaning system 10 is, for example, employed to clean a windshield glass (windshield) 1 installed to a vehicle such as a passenger car. The vehicle cleaning system 10 includes a wiper device provided with a pair of wipers 14, 16, a wiper motor 18, and a link mechanism 20, a control circuit 52, and a washer device 70.

FIG. 1 illustrates an example of a right-hand drive vehicle, in which the right side of the vehicle (the left side in FIG. 1) is a driver's seat side, and the left side of the vehicle (the right side in FIG. 1) is a front passenger seat side. In the case of a left-hand drive vehicle, the left side of the vehicle (the right side in FIG. 1) would be the driver's seat side, and the right side of the vehicle (the left side in FIG. 1) would be the front passenger seat side. In the case of a left-hand drive vehicle, the configuration of the wipers 14, 16 would be reversed in the left-right direction.

An outer edge portion of the windshield glass 1 is configured by a light-blocking portion 1A that is coated with a black ceramic pigment to block visible light and ultraviolet light. The black pigment is coated onto the outer edge portion at a vehicle cabin inside of the windshield glass 1, and is then heat treated at a predetermined temperature such that the pigment melts and fixes to the vehicle cabin inside surface of the windshield glass 1. The windshield glass 1 is fixed to a vehicle body using an adhesive applied to the outer edge portion. As illustrated in FIG. 1, providing the outer edge portion with the light-blocking portion 1A that does not allow ultraviolet light to pass through suppresses ultraviolet deterioration of the adhesive.

The wipers 14, 16 are configured by respective wiper arms 24, 26 and wiper blades 28, 30. Base end portions of the wiper arms 24, 26 are respectively fixed to pivot shafts 42, 44, described later. The wiper blades 28, 30 are respectively fixed to leading end portions of the wiper arms 24, 26.

In the wipers 14, 16, the wiper blades 28, 30 perform a to-and-fro action over the windshield glass 1 accompanying the action of the wiper arms 24, 26, such that the wiper blades 28, 30 wipe the windshield glass 1.

The wiper motor 18 includes an output shaft 32 coupled through a speed reduction mechanism 48 configured mainly by a worm gear. The output shaft 32 is capable of rotating in forward and backward directions. The link mechanism 20 includes a crank arm 34, a first link rod 36, a pair of pivot levers 38, 40, the pair of pivot shafts 42, 44, and a second link rod 46.

One end side of the crank arm 34 is fixed to the output shaft 32, and the other end side of the crank arm 34 is operably coupled to one end side of the first link rod 36. The other end side of the first link rod 36 is operably coupled to the pivot lever 38 at a location nearer to the other end of the pivot lever 38 than the end where the pivot shaft 42 is located. The two ends of the second link rod 46 are operably coupled to the pivot lever 38 at the other end of the pivot lever 38 to the end where the pivot shaft 42 is located, and to the pivot lever 40 at the end of the pivot lever 40 corresponding to the same end of the pivot lever 38.

The pivot shafts 42, 44 are operably supported by non-illustrated pivot holders provided on the vehicle body. The wiper arms 24, 26 are fixed, via the pivot shafts 42, 44, to the ends of the pivot levers 38, 40 where the pivot shafts 42, 44 are located.

In the vehicle cleaning system 10, when the output shaft 32 is rotated forward and then backward through a rotation angle $\theta_1$ within a predetermined range, rotation force of the output shaft 32 is transmitted to the wiper arms 24, 26 through the link mechanism 20, and the wiper blades 28, 30 perform a to-and-fro action over the windshield glass 1 between a lower return position P2 and an upper return position P1 accompanying the to-and-fro action of the wiper arms 24, 26. Various values may be employed as the value of $\theta_1$ according to the configuration of the link mechanism of the vehicle cleaning system and the like. In the present exemplary embodiment $\theta_1$ is, as an example, 90°.

As illustrated in FIG. 1, in the vehicle cleaning system 10 according to the present exemplary embodiment, a configuration is adopted in which the crank arm 34 and the first link rod 36 form a straight line shape when the wiper blades 28, 30 are positioned at a stowed position P3.

The stowed position P3 is provided below the lower return position P2. The wiper blades 28, 30 are made to perform an action to the stowed position P3 by rotating the output shaft 32 by a rotation angle of $\theta_2$ in a predetermined direction from a state in which the wiper blades 28, 30 are at the lower return position P2. Various values may be employed as the value of $\theta_2$ according to the configuration of the link mechanism of the vehicle cleaning system and the like. In the present exemplary embodiment the rotation angle $\theta_2$ is, as an example, 10°.

Note that in cases in which the lower return position P2 and the stowed position P3 are aligned with each other, the $\theta_2$ is "0" and the wiper blades 28, 30 are stopped and stowed at the lower return position P2.

The control circuit 52 is connected to the wiper motor 18 to control rotation of the wiper motor 18. For example, the control circuit 52 according to the present exemplary embodiment computes a duty ratio of a voltage to be applied to the wiper motor 18 based on the rotation direction, rotation position, rotation speed, and rotation angle of the output shaft 32 of the wiper motor 18 as detected by a rotation angle sensor 54 configured to detect the rotation speed and rotation angle of the output shaft 32 of the wiper motor 18. The rotation angle sensor 54 is provided within the speed reduction mechanism 48 of the wiper motor 18, and performs detection by converting a magnetic field (magnetism) of an excitation coil or magnet rotating coupled to the output shaft 32 into an electrical current.

The control circuit 52 includes a microcomputer 58 that is capable of computing the position of the wiper blades 28, 30 on the windshield glass 1 based on the rotation angle of the output shaft 32 as detected by the rotation angle sensor 54, and that controls a wiper motor drive circuit 56B so as to modify the rotation speed of the output shaft 32 according to this position.

The control circuit 52 is provided with memory 60, this being a storage device stored with data and a program employed in controlling a washer drive circuit 56A and the wiper motor drive circuit 56B. For example, the memory 60 is stored with data and a program used to compute rotation speeds and the like (including the rotation angles) of the output shaft 32 of the wiper motor 18 according to the rotation angle of the output shaft 32 of the wiper motor 18, this representing the position of the wiper blades 28, 30 on the windshield glass 1.

In the present exemplary embodiment, the voltage applied to the wiper motor 18 is generated by pulse width modulation (PWM) that modulates a pulse waveform by using a switching element to switch a voltage (approximately 12V) of an onboard battery, serving as a power source, ON and OFF. The duty ratio of the present exemplary embodiment is the duration of a single pulse generated when the switching element is ON proportionate to the duration of a single period of the waveform of the voltage generated by PWM. Moreover, a single period of the waveform of the voltage generated by PWM is the sum of the duration of the single pulse and the duration in which the switching element is OFF and no pulse is generated. The wiper motor drive circuit 56B generates a voltage to be applied to the wiper motor 18 by switching a switching element ON and OFF in the wiper motor drive circuit 56B according to the duty ratios computed by the control circuit 52, and applies the generated voltage to a coil terminal of the wiper motor 18. As described later, the configuration of the wiper motor drive circuit 56B differs depending on whether the wiper motor 18 is a brushless motor or a brushed motor.

The microcomputer 58 of the control circuit 52 also decides the duty ratio of the voltage to be applied to a washer motor 64 that drives a washer pump 66 of the washer device 70, and controls the washer drive circuit 56A so as to generate a voltage with this duty ratio using PWM. The memory 60 is stored with data relating to the duty ratio of the voltage to be applied to the washer motor 64 and a program relating to control of the washer drive circuit 56A.

Since the wiper motor 18 according to the present exemplary embodiment includes the speed reduction mechanism 48 as mentioned above, the rotation speed and rotation angle of the output shaft 32 are not the same as the rotation speed and rotation angle of a wiper motor main body. However, in the present exemplary embodiment, the wiper motor main body and the speed reduction mechanism 48 are configured as a single inseparable unit, and so hereafter the rotation speed and rotation angle of the output shaft 32 are taken as being synonymous with the rotation speed and rotation angle of the wiper motor 18.

A vehicle electronic control unit (ECU) 90 that performs overall control of the vehicle engine and the like is also connected to the microcomputer 58. A wiper switch 50, a washer switch 62, a rain sensor 76, a foreign object removal switch 78 used to set a foreign object removal mode to automatically spray washer fluid when a foreign object such as dirt has been detected on the windshield glass 1, a cancel switch 80 to temporarily cancel an automatic washer fluid spraying action, a remaining level sensor 82 to detect the amount of remaining washer fluid in a washer tank 68, an on-board camera 92 to image ahead of the vehicle, an information display device 94 including an instrument panel and a head-up display (HUD) serving as visual information display sections and an audio output device serving as an audio output section, and a vibration generation device 96 to vibrate the driver's seat are also connected to the vehicle ECU 90.

The wiper switch 50 is a switch that switches power supplied from the vehicle battery to the wiper motor 18 ON and OFF. The wiper switch 50 is capable of switching between a low speed actuation mode selection position to make the wiper blades 28, 30 perform an action at low speed, a high speed actuation mode selection position to make the wiper blades 28, 30 perform an action at high speed, an intermittent actuation mode selection position to make the wiper blades 28, 30 perform an action intermittently at a fixed period, an AUTO actuation mode selection position to make the wiper blades 28, 30 perform an action when raindrops have been detected by the rain sensor 76, and a stowed (inactive) mode selection position. Signals corresponding to the selection positions for each mode are output to the microcomputer 58 via the vehicle ECU 90.

When a signal corresponding to the position of a selected mode is output from the wiper switch 50 and input to the microcomputer 58 via the vehicle ECU 90, the microcomputer 58 uses the data and program stored in the memory 60 to perform control corresponding to the signal output from the wiper switch 50.

The washer switch 62 is a switch used to switch ON or OFF power supplied from the vehicle battery to the washer motor 64 and the wiper motor 18. For example, the washer switch 62 is integrally provided to an operation means such as a lever provided to the wiper switch 50 described above, and is switched ON by an operation such as the occupant pulling the lever toward them. When the washer switch 62 is switched ON, the microcomputer 58 actuates the washer motor 64 and the wiper motor 18.

While the washer switch 62 is ON, rotation of the washer motor 64 provided to the washer device 70 drives the washer pump 66. The washer pump 66 conveys washer fluid under pressure from the washer tank 68 to a driver's seat side hose 72A and a front passenger seat side hose 72B. The driver's seat side hose 72A is connected to a driver's seat side nozzle 74A provided beneath the windshield glass 1 on the driver's seat side. The front passenger seat side hose 72B is connected to a front passenger seat side nozzle 74B provided beneath the windshield glass 1 on the front passenger seat side. The washer fluid that has been conveyed under pressure is sprayed onto the windshield glass 1 from the driver's seat side nozzle 74A and the front passenger seat side nozzle 74B. Washer fluid that has landed on the windshield glass 1 is wiped away, together with dirt on the windshield glass 1, by the action of the wiper blades 28, 30.

The microcomputer 58 performs control such that the action of the washer motor 64 is only performed while the washer switch 62 is ON. The microcomputer 58 also controls the wiper motor 18 such that the action of the wiper blades 28, 30 continues until they reach the lower return position P2 even when the washer switch 62 has been switched OFF.

The rain sensor 76 is, for example, a type of optical sensor provided at the vehicle cabin inside of the windshield glass 1, and detects water droplets on the surface of the windshield glass 1. For example, the rain sensor 76 includes an LED, this being an infrared light-emitting optical device, a photodiode, this being a light receiving element, a lens that forms an infrared light path, and a control circuit. Infrared light radiated from the LED is totally reflected by the windshield glass 1. However, if water droplets are present on the surface of the windshield glass 1, part of the infrared light passes through the water droplets and is released to the outside, reducing the amount reflected by the windshield glass 1. The amount of light that enters the photodiode, this being the light receiving element, therefore decreases. This reduction in the amount of light is used to detect water droplets on the surface of the windshield glass 1.

The foreign object removal switch 78 is a switch used to set the foreign object removal mode in which washer fluid is automatically sprayed and a wiping action is performed by the wiper blades 28, 30 when the foreign object removal switch 78 is in an ON state and a water droplet or a foreign object such as dirt has been detected on the surface of the windshield glass 1. The foreign object removal switch 78 may be provided close to the wiper switch 50 or the washer switch 62, or may be provided on a vehicle dashboard or instrument panel.

The cancel switch 80 is a switch used to temporarily cancel (disable) an automatic spraying and wiping action when the vehicle cleaning system 10 is to perform automatic spraying of washer fluid and a wiping action with the wiper blades 28, 30 when set to the foreign object removal mode. A user, namely the driver, switches the cancel switch 80 ON if for example they consider that spraying washer fluid would actually be detrimental to their field of sight. The cancel switch may be provided close to the foreign object removal switch 78, or may be provided as a touch sensor within the display of the HUD. Such a touch sensor is, for example, an optical sensor configured to scan non-visible light such as infrared light above the HUD, and to identify input by detecting coordinates where the non-visible light is blocked by a finger or the like.

The remaining level sensor 82 is a sensor to detect the amount of remaining washer fluid in the washer tank 68, and, for example, employs an electrostatic capacitive sensor.

The on-board camera 92 is provided at the vehicle cabin inside of the windshield glass 1 to acquire image data from ahead of the vehicle. The image data acquired by the on-board camera 92 is for example employed in control during automated driving or advanced driver-assistance by the vehicle. The on-board camera 92 according to the present exemplary embodiment is what is referred to as a stereo camera, and includes a right image capture section 92R and a left image capture section 92L so as to enable the distance to a captured object to be computed from the acquired image data. The on-board camera need not be a stereo camera in cases in which the vehicle includes a separate device such as a millimeter-wave radar capable of spotting obstacles and the like ahead of the vehicle and detecting the distance to such obstacles.

The vehicle ECU 90 outputs a command signal to the control circuit 52 to actuate the wipers 14, 16 based on a signal output from the rain sensor 76, and controls automated driving or advanced driver-assistance by the vehicle based on the image data acquired by the on-board camera 92. The vehicle ECU 90 is further capable of computing the brightness ahead of the vehicle from the brightness of video data acquired by the on-board camera 92.

As illustrated in FIG. 1, in the present exemplary embodiment, the rain sensor 76 and the on-board camera 92 are provided in a functional area 98 close to an upper central portion of the windshield glass 1. The functional area 98 is a predetermined range capable of covering a detection range of the rain sensor 76 and a field of view of images captured by the on-board camera 92.

As described above, the information display device 94 includes the instrument panel, the audio output device, the HUD, and so on. For example, in the present exemplary embodiment, when in the foreign object removal mode, the information display device 94 displays information relating to actuation of the washer device 70 and the like using warning lights on the instrument panel, or display on the HUD. The information display device 94 also announces actuation of the washer device 70 using the audio output device.

The vibration generation device 96 is a device used to vibrate the driver's seat. In the present exemplary embodiment, the vibration generation device 96 is actuated when the washer device 70 or the like is actuated in the foreign object removal mode. The vibration generation device 96 may be provided at a location other than the driver's seat, for example in a steering wheel of the vehicle. When the washer device 70 is actuated in the foreign object removal mode, the driver's seat or the steering wheel is vibrated, or both the driver's seat and the steering wheel are vibrated, in order to notify the user.

Figure 2:
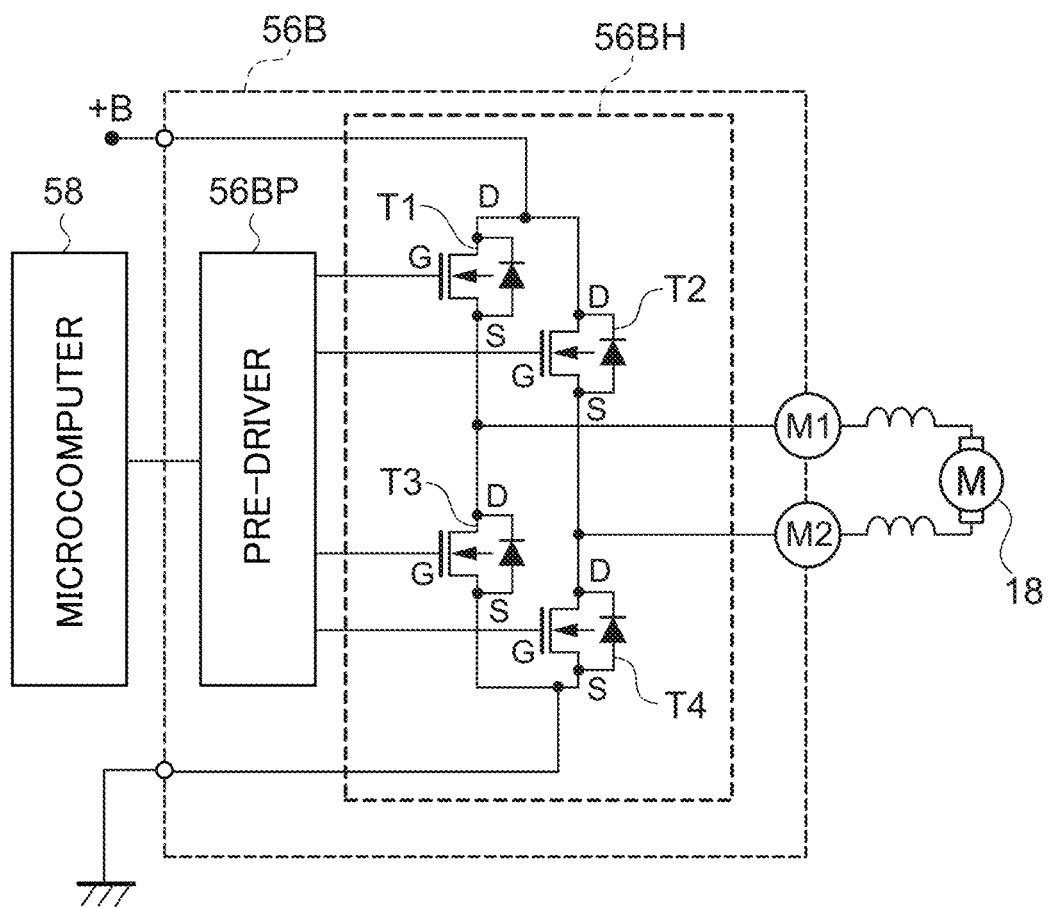
FIG. 2 is a block diagram illustrating an example of a wiper motor drive circuit in a case in which a wiper motor is configured by a brushed motor.

FIG. 2 is a block diagram illustrating an example of the wiper motor drive circuit 56B in cases in which the wiper motor 18 is a brushed motor. The wiper motor drive circuit 56B includes a pre-driver 56BP that generates a drive signal to operate switching elements of a voltage generation circuit 56BH and outputs the drive signal to the voltage generation circuit 56BH based on a control signal input by the microcomputer 58, and the voltage generation circuit 56BH that generates power to be supplied to the wiper motor 18 by operating the switching elements based on the drive signal.

As illustrated in FIG. 2, the voltage generation circuit 56BH is an H bridge circuit that employs transistors T1, T2, T3, and T4, which are N-channel FETs, as switching elements. The drains of the transistor T1 and the transistor T2 are each connected to the positive electrode of a battery, and the sources of the transistor T1 and the transistor T2 are connected to the drains of the transistor T3 and the transistor T4, respectively. The sources of the transistor T3 and the transistor T4 are grounded.

The source of the transistor T1 and the drain of the transistor T3 are connected to one end of the coil of the wiper motor 18, and the source of the transistor T2 and the drain of the transistor T4 are connected to the other end of the coil of the wiper motor 18.

The transistor T1 and the transistor T4 are switched ON by an H-level drive signal being input to the gates of the transistor T1 and the transistor T4, and a current flows in the wiper motor 18 so as to, for example, make the wiper blades 28, 30 perform an action in a clockwise direction as viewed from inside the vehicle cabin. Furthermore, the voltage of the current can be modulated by using PWM to perform micro ON/OFF control of one out of the transistor T1 or the transistor T4 while the other thereof is being controlled ON.

The transistor T2 and the transistor T3 are switched ON by an H-level drive signal being input to the gates of the transistor T2 and the transistor T3, and a current flows in the wiper motor 18 so as to, for example, make the wiper blades 28, 30 perform an action in a counterclockwise direction as viewed from inside the vehicle cabin. Furthermore, the voltage of the current can be modulated by using PWM to perform micro ON/OFF control of one out of the transistor T2 or the transistor T3 while the other thereof is being controlled ON.

Figure 3:
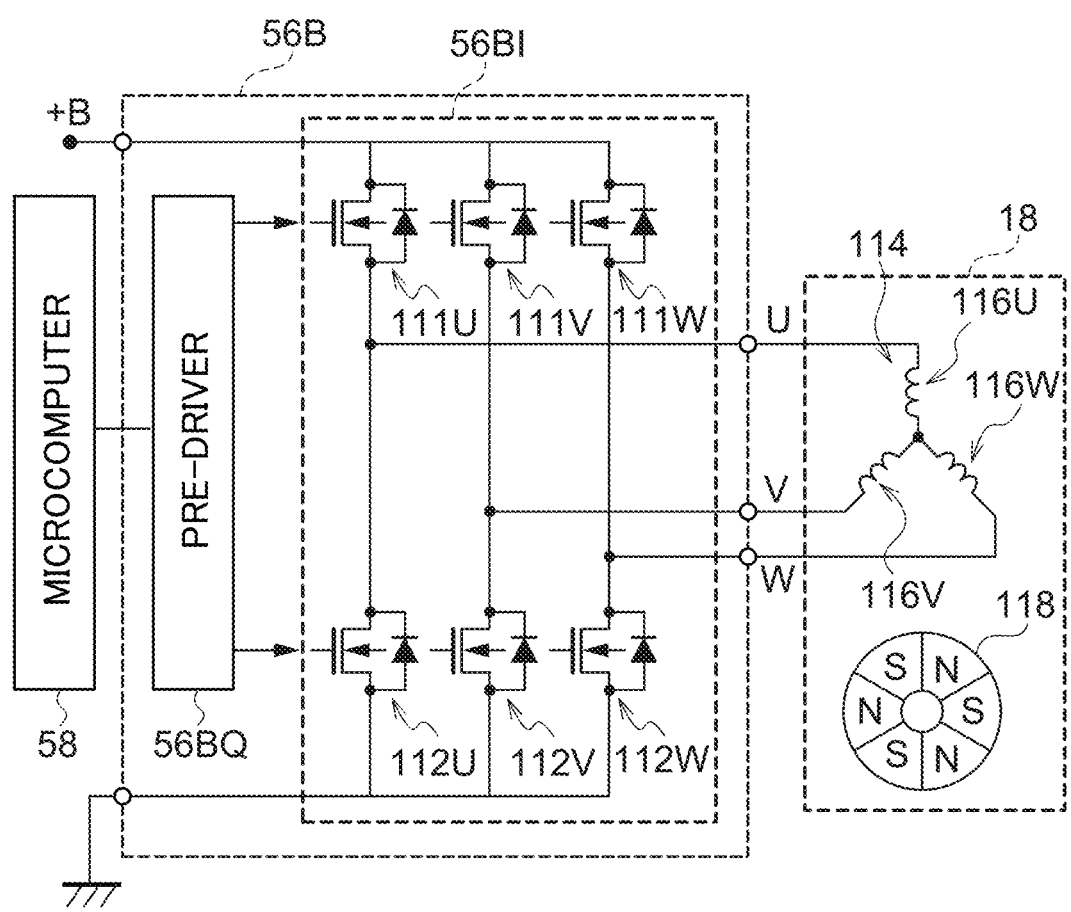
FIG. 3 is a block diagram illustrating an example of a wiper motor drive circuit in a case in which a wiper motor is configured by a brushless motor.

FIG. 3 is a block diagram illustrating an example of the wiper motor drive circuit 56B in a case in which the wiper motor 18 is a brushless motor. Such a voltage generation circuit 56BI is configured by a three-phase (a U phase, a V phase, and a W phase) inverter.

In cases in which the wiper motor 18 is a brushless motor, rotation control of the wiper motor 18 requires generation of voltages approximating a three-phase alternating current with phases corresponding to the positions of the magnetic poles of permanent magnets of a rotating rotor 118, these voltages being applied to coils 116U, 116V, 116W of a stator 114. The coils 116U, 116V, 116W to which the voltages are applied generate a rotating magnetic field that causes the rotor 118 to rotate, and the rotor 118 rotates according to the rotating magnetic field.

Changes in the magnetic field of a sensor magnet provided to the rotor 118, or to the magnetic poles corresponding to the rotor 118, are detected by a Hall sensor (not illustrated in the drawings) or the like employing Hall elements, and the microcomputer 58 computes the positions of the magnetic poles of the rotor 118 from the detected changes in the magnetic field.

A signal for instructing the rotation speed of the wiper motor 18 (rotor 118) is input to the microcomputer 58 from the wiper switch 50 through the vehicle ECU 90. The microcomputer 58 computes the voltage phases to be applied to the coils of the wiper motor 18 based on the positions of the magnetic poles of the rotor 118, generates a control signal to control the wiper motor drive circuit 56B based on the computed phases and the rotation speed of the rotor 118 instructed by the wiper switch 50, and outputs this control signal to a pre-driver 56BQ.

The pre-driver 56BQ generates a drive signal to operate the switching elements of the voltage generation circuit 56BI based on the input control signal, and outputs this drive signal to the voltage generation circuit 56BI.

As illustrated in FIG. 3, the voltage generation circuit 56BI includes three N-channel field effect transistors (FETs) 111U, 111V, 111W (referred to hereafter as FETs 111U, 111V, 111W), serving as upper tier switching elements, and three N-channel field effect transistors 112U, 112V, 112W (referred to hereafter as FETs 112U, 112V, 112W), serving as lower tier switching elements. Note that the FETs 111U, 111V, 111W and the FETs 112U, 112V, 112W are referred to collectively as the FETs 111 and the FETs 112 when there is no need to distinguish between them individually, and are suffixed with U, V, or W when there is a need to distinguish between them individually.

Of the FETs 111 and the FETs 112, the source of the FET 111U and the drain of the FET 112U are connected to a terminal of the coil 116U, the source of the FET 111V and the drain of the FET 112V are connected to a terminal of the coil 116V, and the source of the FET 111W and the drain of the FET 112W are connected to a terminal of the coil 116W.

The gates of the FETs 111 and the FETs 112 are connected to the pre-driver 56BQ and are input with a drive signal. When an H-level drive signal is input to the gates of the FETs 111 and the FETs 112, the FETs 111 and the FETs 112 are switched to an ON state in which current flows from the drains to the sources. When an L-level drive signal is input to the gates, the FETs 111 and the FETs 112 are switched to an OFF state in which current does not flow from the drains to the sources.

A voltage that causes the rotor 118 to rotate at the rotation speed instructed by the wiper switch 50, and that changes according to the positions of the magnetic poles of the rotor 118, is generated using PWM to switch the respective FETs 111, 112 of the voltage generation circuit 56BI ON or OFF according to the drive signal.

Since the washer motor 64 does not require such strict rotation control as the wiper motor 18, generally a brushed motor is employed therefor. In such cases, the washer drive circuit 56A will have a similar configuration to that of the wiper motor drive circuit 56B illustrated in FIG. 2. However, in cases in which a brushless motor is employed for the washer motor 64, the washer drive circuit 56A will have a similar configuration to that of the wiper motor drive circuit 56B illustrated in FIG. 3.

Figure 4:
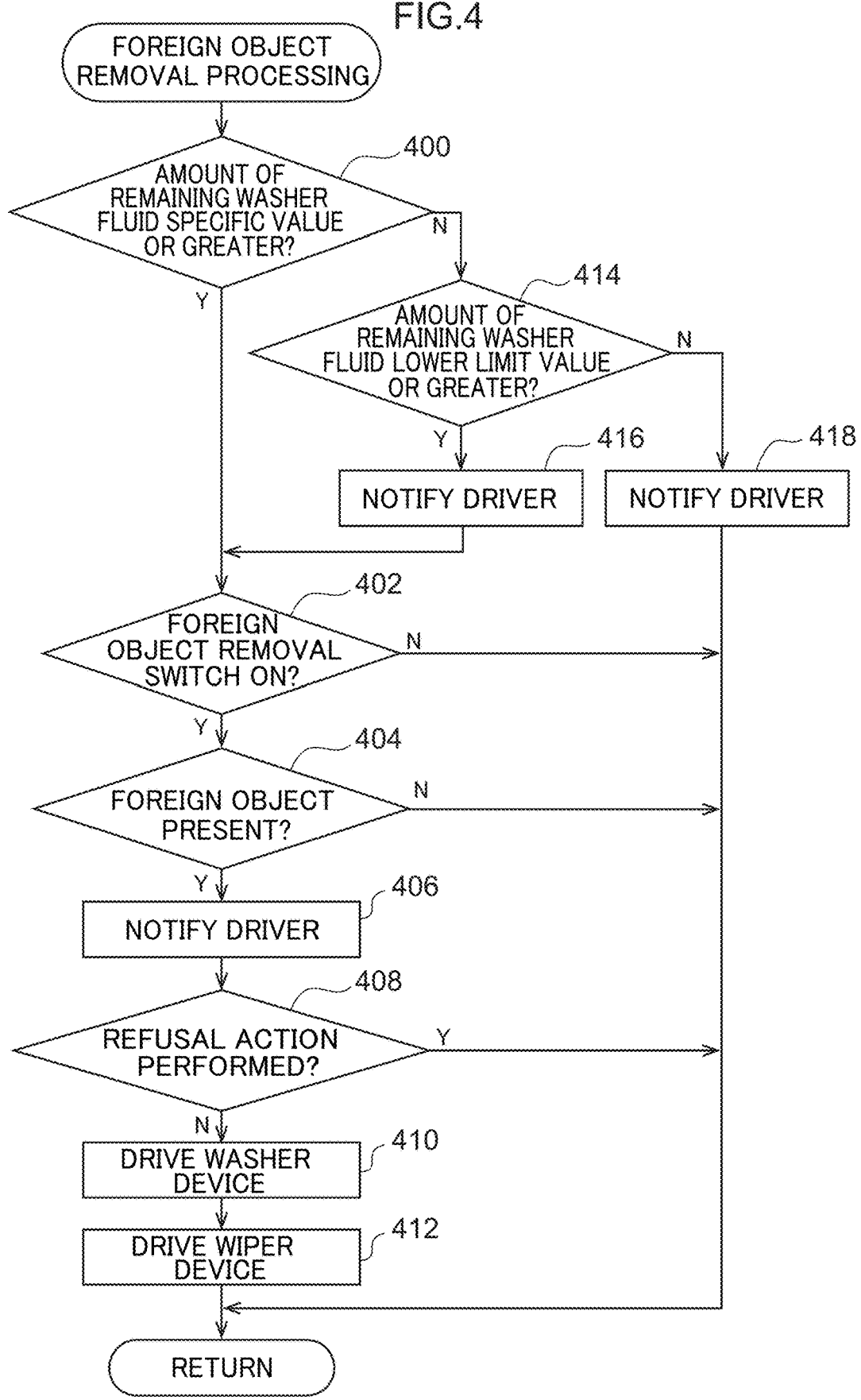
FIG. 4 is a flowchart illustrating an example of foreign object removal processing of a vehicle washer system according to the first exemplary embodiment of the present disclosure.

FIG. 4 is a flowchart illustrating an example of foreign object removal processing of the vehicle cleaning system 10 according to the present exemplary embodiment. The flowchart in FIG. 4 illustrates processing executed by the vehicle ECU 90. At step 400, determination is made as to whether or not the amount of remaining washer fluid in the washer tank 68 as detected by the remaining level sensor 82 is a specific value or greater. Since a shaft bearing of a turbine of the washer pump 66 used to convey washer fluid under pressure is lubricated by the washer fluid, if the washer fluid in the washer tank 68 runs low, lubrication of the shaft bearing may suffer, which might result in damage to the washer pump 66. In the present exemplary embodiment, prior to actuating the washer device 70, determination is made as to whether or not the amount of remaining washer fluid in the washer tank 68 is at least a specific value corresponding to a sufficient amount to actuate the washer pump 66, and the washer pump is actuated in cases in which the amount of remaining washer fluid is the specific value or greater. The specific value used as the basis for the determination of step 400 will differ depending on the shape and capacity of the washer tank 68, as well as the specifications of the washer pump 66 and so on, but as an example is 20% of the total capacity of the washer tank 68.

In cases in which the amount of remaining washer fluid is the specific value or greater at step 400, at step 402 determination is made as to whether or not the foreign object removal switch 78 has been switched ON. In cases in which the foreign object removal switch 78 is determined to be ON at step 402, processing transitions to step 404. In cases in which the foreign object removal switch 78 is determined to be OFF at step 402, the washer device 70 is not actuated and processing returns.

Figure 5:
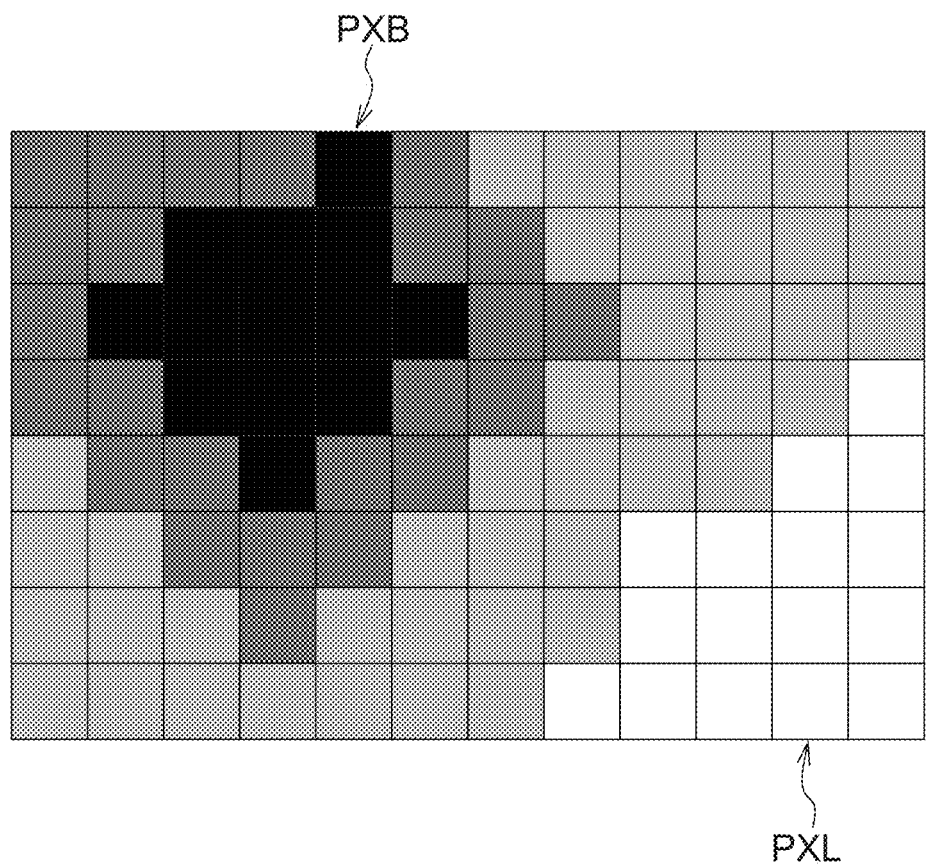
FIG. 5 is an enlarged diagram illustrating an example of image data acquired by an on-board camera in a case in which a foreign object such as dirt has adhered to a functional area.

At step 404, determination is made as to whether or not a water droplet or a foreign object such as dirt is present on the surface of the windshield glass 1. Water droplets are detected by the rain sensor 76. Foreign objects such as dirt are, for example, detected using image data acquired by the on-board camera 92. FIG. 5 is an enlarged diagram illustrating an example of image data acquired by the on-board camera 92 in a case in which a foreign object such as dirt has adhered to the functional area 98. Each of the squares in FIG. 5 corresponds to a pixel configuring the image data. In cases in which a foreign object such as dirt is not present on the surface of the windshield glass 1, a brightness (pixel value) close to white as in the pixel PXL is observed, whereas in cases in which dirt is present on the surface of the windshield glass 1, a pixel value close to black as in the pixel PXB is observed.

Figure 6:
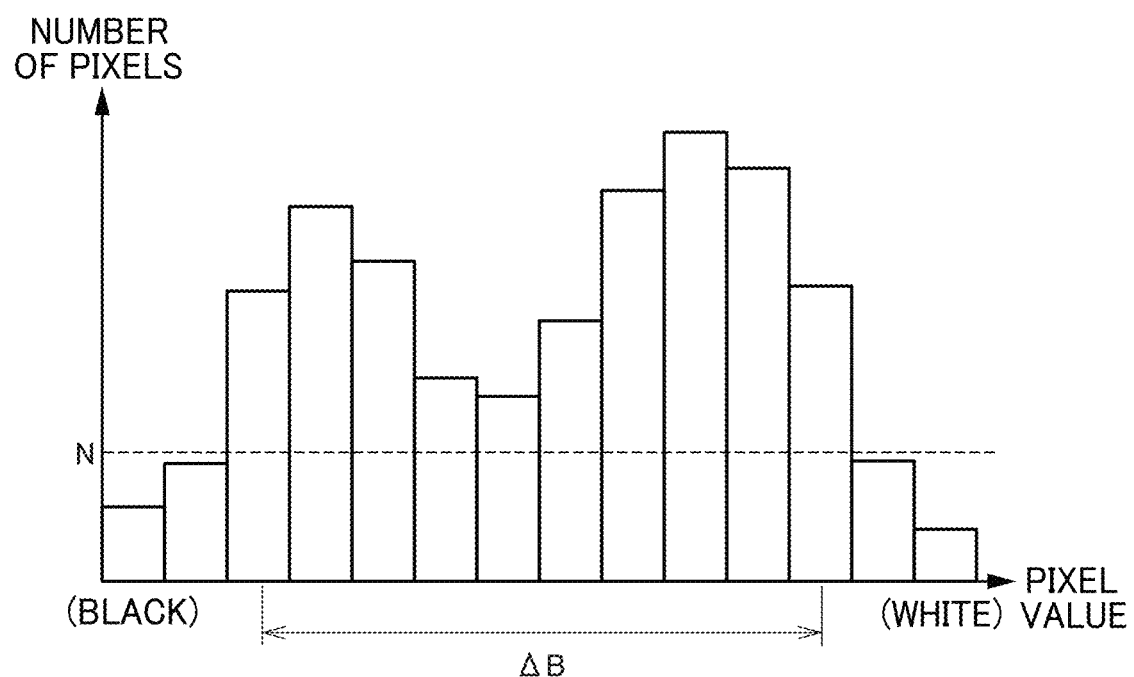
FIG. 6 is an example of a histogram of the image data illustrated in FIG. 5.

FIG. 6 illustrates an example of a histogram from the image data illustrated in FIG. 5. In FIG. 6, the horizontal axis represents pixel values, and the vertical axis represents the number of pixels. In the present exemplary embodiment, in cases in which a brightness difference AB, this being the difference between the maximum and the minimum pixel values that include a predetermined pixel quantity N or greater, is a predetermined threshold value or greater, a foreign object such as dirt is determined to be present on the surface of the windshield glass 1. Pixels present in quantities below the predetermined pixel quantity N could be noise in the image data, and these pixels are therefore not employed in the determination relating to the maximum and minimum pixel values. The predetermined pixel quantity N will differ depending on the specification of the on-board camera 92 and the like, but as an example $N=2^m$ (m=2 to 4).

In cases in which a water droplet or a foreign object such as dirt has been determined to be present on the surface of the windshield glass 1 at step 404, processing transitions to step 406. In cases in which a water droplet or a foreign object such as dirt has been determined not to be present on the surface of the windshield glass 1 at step 404, processing returns.

Figure 7:
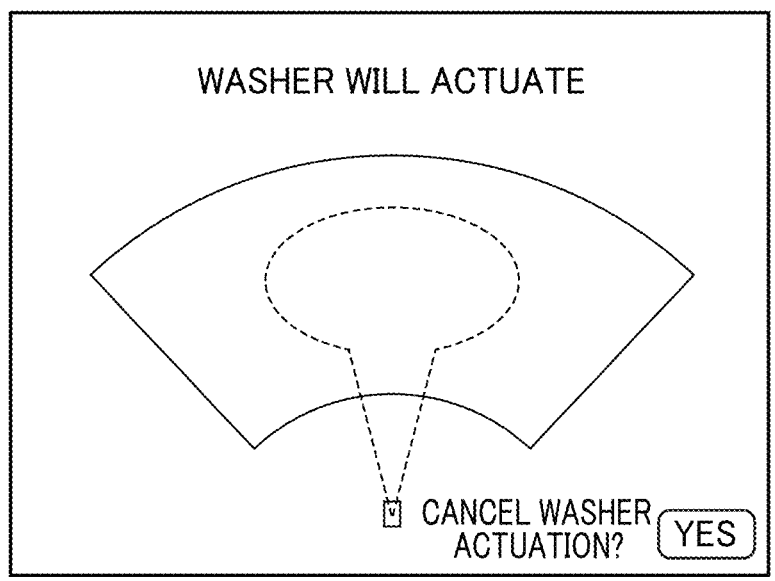
FIG. 7 is a schematic diagram illustrating an example of an HUD display.

At step 406, the driver is notified that the washer device 70 will be actuated. This notification is performed by the information display device 94 by illuminating a warning light on the instrument panel, displaying the fact that the washer device 70 will be actuated on the HUD, and announcing the fact that the washer device 70 will be actuated using the audio output device. Moreover, the vibration generation device 96 in the driver's seat is actuated to make the driver aware that the washer device 70 will be actuated. FIG. 7 is a schematic diagram illustrating an example of display on the HUD. In FIG. 7, text and a schematic graphic are displayed to indicate the fact that the washer device 70 will be actuated, and text asking whether or not to cancel actuation of the washer device 70 is also displayed.

At step 408, determination is made as to whether or not a washer device 70 actuation refusal action has been performed by switching ON the cancel switch 80 or touching a "YES" icon on the HUD display illustrated in FIG. 7. In cases in which a washer device 70 actuation refusal action is determined to have been performed at step 408, processing returns. In cases in which a washer device 70 actuation refusal action has not been performed within a predetermined timeframe and the washer device 70 actuation refusal action has been determined not to have been performed at step 408, processing transitions to step 410. Although the predetermined timeframe used to determine whether or not a washer device 70 actuation refusal action has been performed will differ depending on the specifications of the vehicle and the vehicle cleaning system 10, the predetermined timeframe is approximately 5 to 10 seconds after the start of notification as an example.

At step 410, a command signal to drive the washer device 70 so as to spray washer fluid for a predetermined duration, and at step 412, a command signal to drive the wiper device such that the wiper blades 28, 30 perform a predetermined number of to-and-fro wiping actions between the lower return position P2 and the upper return position P1, are respectively output to the control circuit 52, and the processing returns. The predetermined duration for spraying washer fluid will differ depending on the specifications of the vehicle and the vehicle cleaning system 10, but is approximately 3 to 10 seconds as an example. The predetermined number of to-and-fro wiping actions will differ depending on the specifications of the vehicle and the vehicle cleaning system 10, but is from 1 to 3 return journeys as an example.

In cases in which the amount of remaining washer fluid in the washer tank 68 is below the specific value at step 400, at step 414 determination is made as to whether or not the amount of remaining washer fluid in the washer tank 68 as detected by the remaining level sensor 82 is a lower limit value or greater. The lower limit value used as the basis for the determination of step 414 is the minimum amount of remaining washer fluid at which safe actuation of the washer pump 66 is possible. The lower limit value will differ depending on the shape and capacity of the washer tank 68 as well as the specifications of the washer pump 66 and the like, but is 5% of the capacity of the washer tank 68 as an example.

In cases in which the amount of remaining washer fluid is the lower limit value or greater at step 414, at step 416 the driver is notified of the fact that the amount of remaining washer fluid is low. This notification is performed by the information display device 94 by illuminating a warning light on the instrument panel, displaying the fact that the amount of remaining washer fluid is low on the HUD, and announcing the fact that the amount of remaining washer fluid is low using the audio output device. Moreover, the vibration generation device 96 in the driver's seat is actuated to make the driver aware that the amount of washer fluid is low. After notifying the driver that the amount of washer fluid is low at step 416, processing transitions to step 402.

In cases in which the amount of remaining washer fluid is below the lower limit value at step 414, at step 418 the driver is notified of the fact that washer fluid cannot be sprayed due to the lack of washer fluid. This notification is performed by the information display device 94 by flashing a warning light on the instrument panel, displaying the fact that washer fluid cannot be sprayed due to the lack of washer fluid on the HUD, and emitting a warning sound or announcing the fact that washer fluid cannot be sprayed due to the lack of washer fluid using the audio output device. Moreover, the vibration generation device 96 in the driver's seat is actuated to make the driver aware of the fact that washer fluid cannot be sprayed due to the lack of washer fluid. After notifying the driver that washer fluid cannot be sprayed due to the lack of washer fluid at step 418, processing returns without actuating the washer device 70.

The actions of steps 416 and 418 enables the driver to perceive the amount of remaining washer fluid.

Note that in the foreign object removal processing illustrated in FIG. 4, values X for the amount of remaining washer fluid in the washer tank 68 are categorized into three patterns, namely X≥20%, 5%≤X<20%, and X<5%. However, there is no limitation thereto, and the amount of remaining washer fluid in the washer tank 68 may be categorized into two patterns, namely X≥5% and X<5%.

There is no limitation to a specific value of 20% and a lower limit value of 5%, and these values may be set as appropriate based on the vehicle type, the capacity of the washer tank 68, and the like.

As described above, in the present exemplary embodiment, when a water droplet or a foreign object such as dirt is detected on the surface of the windshield glass 1 and the windshield glass 1 is to be cleaned automatically by spraying washer fluid, the information display device 94 enables the fact that the washer device 70 is to be actuated automatically to be perceived visually and audibly, and also attracts the attention of the user by vibrating the driver's seat using the vibration generation device 96. This thereby enables automatic cleaning of the windshield glass 1 while suppressing user unease, and enables water droplets and foreign objects such as dirt to be prevented from obstructing the acquisition of image data by the on-board camera 92, this being necessary for automated driving and advanced driver-assistance.

In the exemplary embodiment described above, the driver is notified of the fact that the washer device 70 will be actuated by illuminating a warning light on the instrument panel, displaying the fact that the washer device 70 will be actuated on the HUD, announcing the fact that the washer device 70 will be actuated using the audio output device, and actuating the vibration generation device 96 in the driver's seat. However, there is no limitation thereto. For example, the driver may be notified of the fact that the washer device 70 will be actuated simply by illuminating a warning light on the instrument panel and displaying the fact that the washer device 70 will be actuated on the HUD. Alternatively, the fact that the washer device 70 will be actuated may be announced using the audio output device alone. Namely, notification may be performed using any one out of a visual information display section, an audio output section, or a vibration generation section alone, or may be performed using any combination thereof.

Moreover, in the exemplary embodiment described above, the driver is notified of the fact that washer fluid cannot be sprayed due to a lack of washer fluid by flashing a warning light on the instrument panel, displaying the fact that washer fluid cannot be sprayed due to the lack of washer fluid on the HUD, announcing the fact that washer fluid cannot be sprayed due to the lack of washer fluid using the audio output device, and actuating the vibration generation device 96 in the driver's seat. However, there is no limitation thereto. For example, the driver may be notified of the fact that washer fluid cannot be sprayed due to a lack of washer fluid simply by flashing a warning light on the instrument panel and displaying the fact that washer fluid cannot be sprayed due to the lack of washer fluid on the HUD. Alternatively, the fact that washer fluid cannot be sprayed due to a lack of washer fluid may be announced using the audio output device alone. Namely, notification may be performed using any one out of a visual information display section, an audio output section, or a vibration generation section alone, or may be performed using any combination thereof.

Note that although the cancel switch 80 is provided in the exemplary embodiment described above, the cancel switch 80, there is no limitation thereto, and the cancel switch 80 may be omitted. In such cases, step 408 in FIG. 4 is also omitted.

Note that in the exemplary embodiment described above, the remaining level sensor 82 is provided as a sensor to detect the amount of remaining washer fluid in the washer tank 68. However, there is no limitation thereto, and the remaining level sensor 82 may be omitted. In such cases, step 400, step 414, step 416, and step 418 in FIG. 4 are also omitted.

Note that although the user confirms whether or not to cancel actuation of the washer device 70 in the exemplary embodiment described above, there is no limitation thereto, and the user may confirm whether or not to actuate the washer device 70.

Second Exemplary Embodiment

Figure 8:
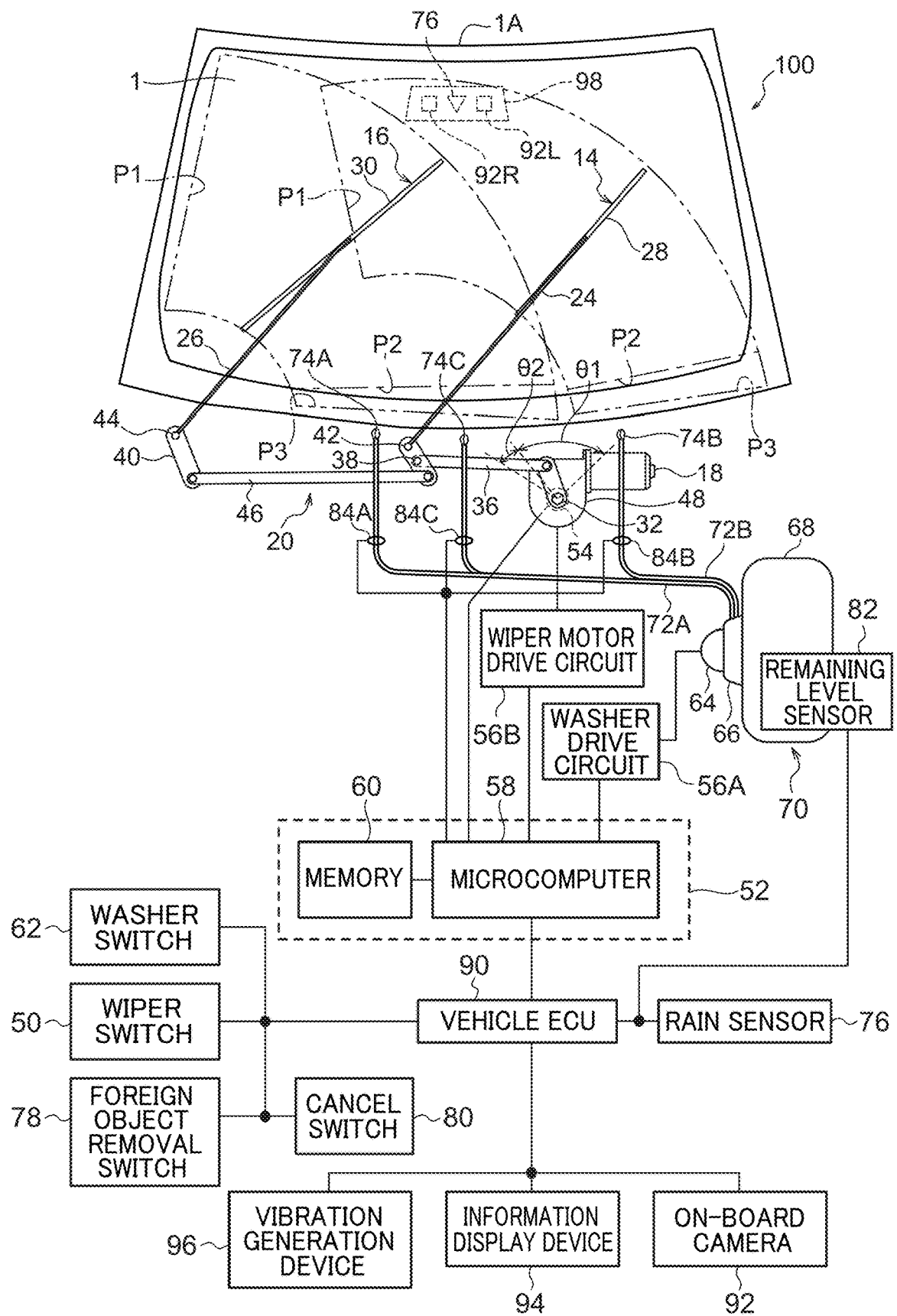
FIG. 8 is a schematic diagram illustrating configuration of a vehicle cleaning system according to a second exemplary embodiment of the present disclosure.

Explanation follows regarding a second exemplary embodiment of the present disclosure. FIG. 8 is a schematic diagram illustrating configuration of a vehicle cleaning system 100 according to the present exemplary embodiment. The present exemplary embodiment differs from the first exemplary embodiment in the inclusion of a functional area nozzle 74C configured to spray washer fluid toward the functional area 98, and solenoid valves 84A, 84B, and 84C. Other configurations are similar to those of the first exemplary embodiment, and so these configurations are allocated the same reference numerals and detailed explanation thereof is omitted.

In the present exemplary embodiment, in cases in which a foreign object such as dirt is present on the surface of the windshield glass 1, washer fluid is only sprayed from the functional area nozzle 74C for a predetermined duration in order to prioritize securing the field of sight of the on-board camera 92 that acquires information necessary for automated driving and advanced driver-assistance by the vehicle. Washer fluid is sprayed from the functional area nozzle 74C along by closing the solenoid valves 84A, 84B, opening the solenoid valve 84C, and rotating the washer motor 64 to actuate the washer pump 66. Note that the solenoid valve 84A is disposed between the washer pump 66 and the driver's seat side nozzle 74A, the solenoid valve 84B is disposed between the washer pump 66 and the front passenger seat side nozzle 74B, and the solenoid valve 84C is disposed between the washer pump 66 and the functional area nozzle 74C. The predetermined duration for spraying washer fluid will differ depending on the specifications of the vehicle and the vehicle cleaning system 100, but is approximately 3 to 10 seconds as an example.

After washer fluid has been sprayed for the predetermined duration, the wiper blades 28, 30 perform a predetermined number of to-and-fro wiping actions between the lower return position P2 and the upper return position P1. The predetermined number of to-and-fro wiping actions will differ depending on the specifications of the vehicle and the vehicle cleaning system 100, but is from 1 to 3 return journeys as an example.

In the present exemplary embodiment, after prioritizing wiping of the functional area 98, the solenoid valves 84A, 84B are opened and the solenoid valve 84C is closed so as to spray washer fluid from the driver's seat side nozzle 74A and the front passenger seat side nozzle 74B for a predetermined duration (without spraying washer fluid from the functional area nozzle 74C). The predetermined duration is approximately 3 to 10 seconds as an example.

After this, the wiper blades 28, 30 perform a predetermined number of to-and-fro wiping actions between the lower return position P2 and the upper return position P1. The predetermined number of to-and-fro wiping actions is from 1 to 3 return journeys as an example. These wiping actions remove the foreign object from the surface of the windshield glass 1, thereby securing the forward field of view of users (including the driver).

As described above, in the present exemplary embodiment, in cases in which a foreign object such as dirt has been detected on the surface of the windshield glass 1, the functional area 98 close to the lens of the on-board camera 92 is cleaned as a priority in order to secure the field of sight of the on-board camera 92 that acquires information related to automated driving and advanced driver-assistance by the vehicle.

This cleaning enables automated driving or advanced driver-assistance by the vehicle to be continued normally, and similarly to the first exemplary embodiment, in cases in which it is necessary to spray washer fluid, the information display device 94 enables the fact that the washer device 70 is being actuated automatically to be perceived visually and audibly, and also attracts the attention of the user by vibrating the driver's seat using the vibration generation device 96. This thereby enables automatic cleaning of the windshield glass 1 while suppressing user unease, and enables water droplets and foreign objects such as dirt to be prevented from obstructing the acquisition of image data by the on-board camera 92, this being necessary for automated driving and advanced driver-assistance.

Note that in the exemplary embodiment described above, after the washer fluid has been sprayed from the functional area nozzle 74C alone for the predetermined duration, the washer fluid is sprayed from the driver's seat side nozzle 74A and the front passenger seat side nozzle 74B for a predetermined duration. However, there is no limitation thereto. For example, configuration may be made such that when the foreign object removal switch 78 is ON, the washer fluid is sprayed from the driver's seat side nozzle 74A, the front passenger seat side nozzle 74B, and the functional area nozzle 74C for a predetermined duration, and when the foreign object removal switch 78 is OFF, the washer fluid is sprayed from the driver's seat side nozzle 74A and the front passenger seat side nozzle 74B for a predetermined duration. Namely, configuration may be made such that when the foreign object removal switch 78 is ON, the solenoid valves 84A, 84B, 84C are opened and the washer motor 64 is rotated to actuate the washer pump 66, and when the foreign object removal switch 78 is OFF, the solenoid valve 84C is closed, the solenoid valves 84A, 84B are opened, and the washer motor 64 is rotated to actuate the washer pump 66.

Third Exemplary Embodiment

Figure 9:
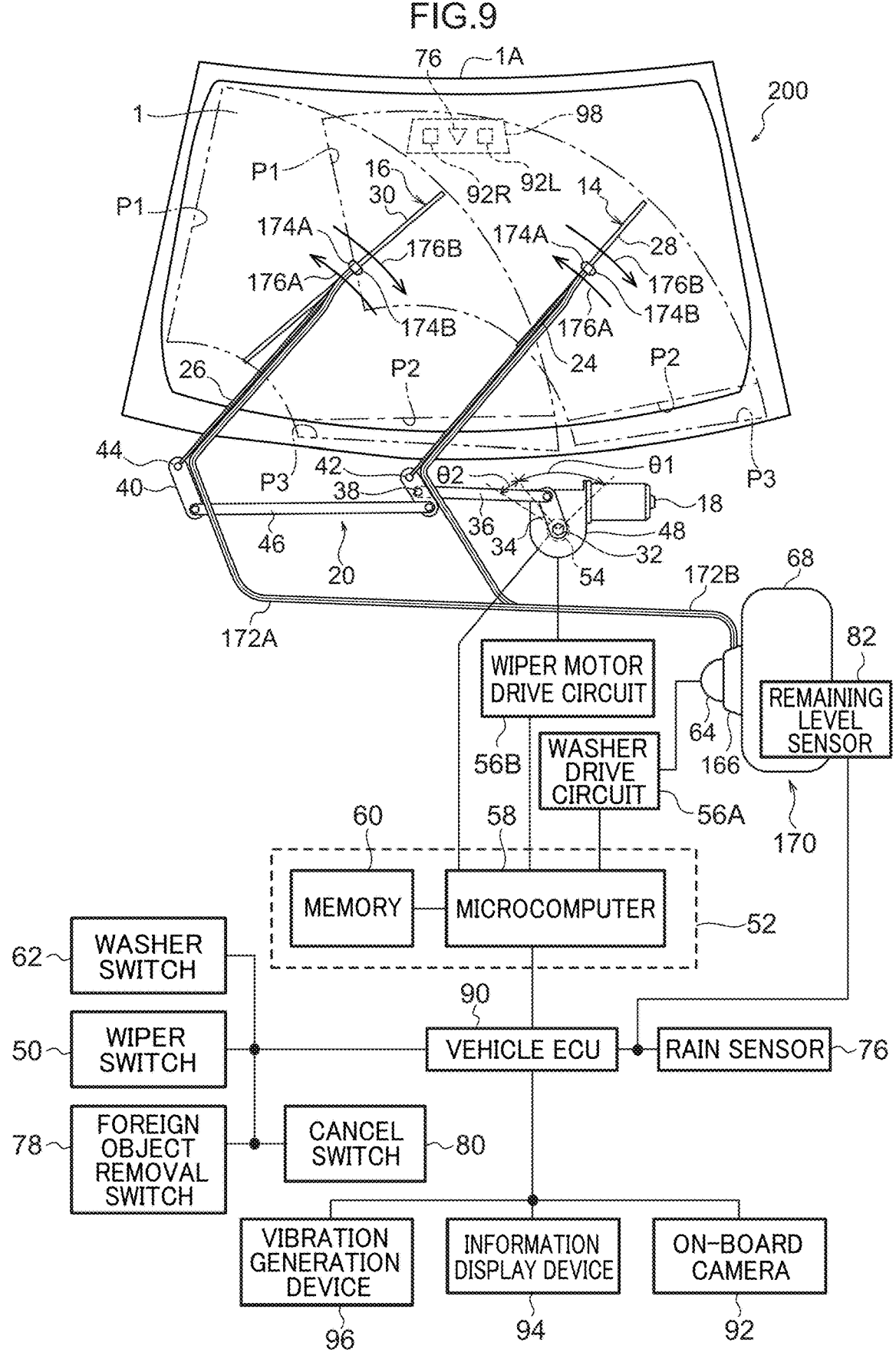
FIG. 9 is a schematic diagram illustrating configuration of a vehicle cleaning system according to a third exemplary embodiment of the present disclosure.

Explanation follows regarding a third exemplary embodiment of the present disclosure. FIG. 9 is a schematic diagram illustrating configuration of a vehicle cleaning system 200 according to the present exemplary embodiment. A washer device 170 of the present exemplary embodiment differs from that of the first exemplary embodiment in the provision of washer fluid spray nozzles to the wiper arms 24, 26. Other configurations are similar to those of the first exemplary embodiment, and so these configurations are allocated the same reference numerals and detailed explanation thereof is omitted.

In the present exemplary embodiment, a washer pump 166 is driven by rotation of the washer motor 64. The washer pump 166 conveys washer fluid under pressure from the washer tank 68 to either opening spray hoses 172A or closing spray hoses 172B. The opening spray hoses 172A are connected to opening spray nozzles 174A respectively provided close to the leading ends of the wiper arms 24, 26. The closing spray hoses 172B are connected to closing spray nozzles 174B respectively provided close to the leading ends of the wiper arms 24, 26.

As illustrated in FIG. 9, the opening spray nozzles 174A are provided facing in the direction of the action of the wiper blades 28, 30 during an opening action of the wiper blades 28, 30 to wipe from the lower return position P2 to the upper return position P1, namely, facing toward the upper return position P1. In the present exemplary embodiment, washer fluid is sprayed from the opening spray nozzles 174A in an opening spray direction 176A during the opening action.

As illustrated in FIG. 9, the closing spray nozzles 174B are provided facing in the direction of the action of the wiper blades 28, 30 during a closing action of the wiper blades 28, 30 to wipe from the upper return position P1 to the lower return position P2, namely, facing toward the lower return position P2. In the present exemplary embodiment, washer fluid is sprayed from the closing spray nozzles 174B in a closing spray direction 176B during the closing action.

The washer motor 64 is rotated in opposite directions during the opening action and the closing action, thereby driving the washer pump 166 so as to spray washer fluid from the opening spray nozzles 174A during the opening action, and so as to spray washer fluid from the closing spray nozzles 174B during the closing action.

Figure 10:
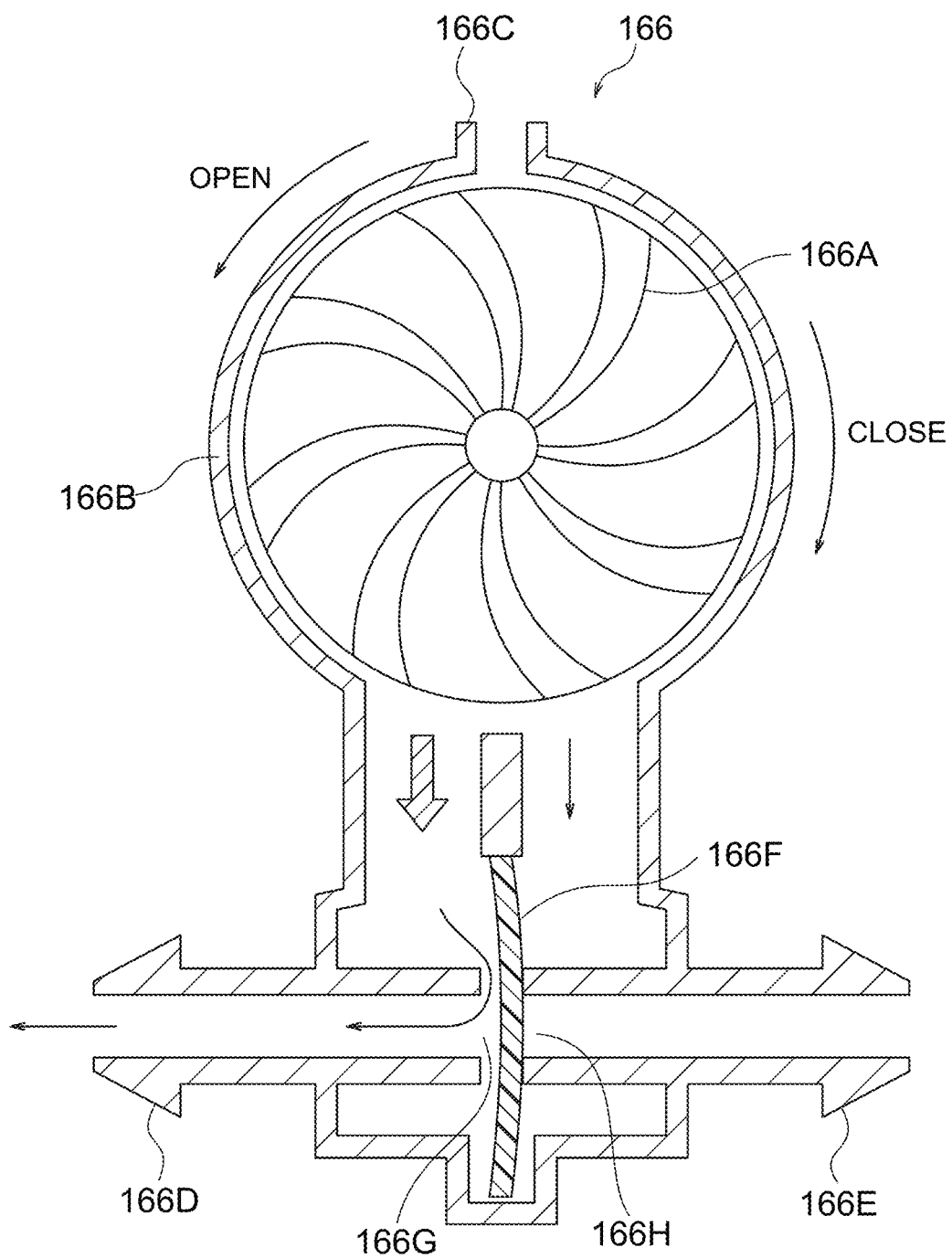
FIG. 10 is a cross-section illustrating an example of a washer pump according to the third exemplary embodiment of the present disclosure.

FIG. 10 is a cross-section illustrating an example of the washer pump 166 according to the present exemplary embodiment. The washer pump 166 according to the present exemplary embodiment is a type of turbo pump including a turbine 166A driven by the washer motor 64. The turbine 166A is driven in the direction of the OPEN arrow during the opening action, and in the direction of the CLOSE arrow during the closing action.

Driving the turbine 166A sucks washer fluid in the washer tank 68 into a pump housing 166B through an intake port 166C. When the turbine 166A is driven in the direction of the OPEN arrow, the washer fluid in the pump housing 166B is discharged through an opening discharge port 166D, and when the turbine 166A is driven in the direction of the CLOSE arrow, the washer fluid in the pump housing 166B is discharged through a closing discharge port 166E. The opening discharge port 166D is connected to the opening spray nozzles 174A through the driver's seat spray hoses 172A, and the closing discharge port 166E is connected to the closing spray nozzles 174B through the closing spray hoses 172B. Accordingly, washer fluid is sprayed through the opening spray nozzles 174A when the turbine 166A is driven in the direction of the OPEN arrow, and through the closing spray nozzles 174B when the turbine 166A is driven in the direction of the CLOSE arrow.

As illustrated in FIG. 10, the washer pump 166 according to the present exemplary embodiment includes a valve 166F configured by an elastic body such as rubber or a synthetic resin. The valve 166F flexes under the pressure of the washer fluid conveyed under pressure by the turbine 166A so as to block either an opening washer fluid inlet 166G or a closing washer fluid inlet 166H.

For example, when the turbine 166A is driven in the direction of the OPEN arrow, pressure on the opening washer fluid inlet 166G side rises such that the valve 166F flexes and blocks the closing washer fluid inlet 166H. When the turbine 166A is driven in the direction of the CLOSE arrow, pressure on the closing washer fluid inlet 166H side rises such that the valve 166F flexes and blocks the opening washer fluid inlet 166G As a result, the washer fluid is sprayed selectively from either the opening spray nozzles 174A or the closing spray nozzles 174B depending on whether the turbine 166A is being driven in a forward rotation direction or a backward rotation direction.

In order to drive the turbine 166A in the direction of the OPEN arrow, the output shaft of the washer motor 64 is rotated in a predetermined direction. The washer drive circuit 56A configures an H bridge circuit similarly to the wiper motor drive circuit 56B in FIG. 2. If the washer drive circuit 56A is considered to be substantially the same as the wiper motor drive circuit 56B in FIG. 2, for example switching the transistor T1 and the transistor T4 ON enables the output shaft of the washer motor 64 to be rotated in the predetermined direction.

In order to drive the turbine 166A in the direction of the CLOSE arrow, the output shaft of the washer motor 64 is rotated in the opposite direction to the predetermined direction. For example, switching the transistor T2 and the transistor T3 in FIG. 2 ON enables the output shaft of the washer motor 64 to be rotated in the opposite direction to the predetermined direction.

Furthermore, the rotation speed of the output shaft of the washer motor 64 in the predetermined direction can be controlled by PWM switching of either of the transistors T1, T4. The rotation speed of the output shaft of the washer motor 64 in the opposite direction to the predetermined direction can be controlled by PWM switching of either of the transistors T2, T3.

As described above, the vehicle cleaning system 200 according to the present exemplary embodiment sprays washer fluid from the respective spray nozzles provided to the wiper arms 24, 26 ahead in the direction of progress of the wiper blades 28, 30, enabling washer fluid to be quickly applied over a wide range of the surface of the windshield glass 1, including the functional area 98.

Moreover, the vehicle cleaning system 200 according to the present exemplary embodiment sprays washer fluid from the respective spray nozzles provided to leading end portions of the wiper arms 24, 26 ahead in the direction of progress of the wiper blades 28, 30, thereby enabling the wiper blades 28, 30 to wipe away the sprayed washer fluid promptly, and preventing the field of sight of the user driving the vehicle from being adversely affected by the sprayed washer fluid.

In the present exemplary embodiment, similarly to in the first exemplary embodiment, when there is a need to spray washer fluid, the information display device 94 enables the fact that the washer device 170 is to be actuated automatically to be perceived visually and audibly, and the vibration generation device 96 attracts the attention of the user by vibrating the driver's seat. This thereby enables automatic cleaning of the windshield glass 1 while suppressing user unease, and enables water droplets and foreign objects such as dirt to be prevented from obstructing the acquisition of image data by the on-board camera 92, this being necessary for automated driving and advanced driver-assistance.

Note that in the exemplary embodiment described above, the opening spray nozzles 174A and the closing spray nozzles 174B are respectively provided close to the leading ends of the wiper arms 24, 26. However, there is no limitation thereto. For example, the opening spray nozzles 174A and the closing spray nozzles 174B may be respectively provided to the wiper blades 28, 30. Alternatively, the opening spray nozzles 174A may be provided close to the leading ends of the wiper arms 24, 26, and the closing spray nozzles 174B may be provided at intermediate portions of the wiper arms 24, 26.

Note that the functional area nozzle 74C of the second exemplary embodiment described above may be provided to enable cleaning of the functional area 98 to be prioritized.

Fourth Exemplary Embodiment

Figure 11:
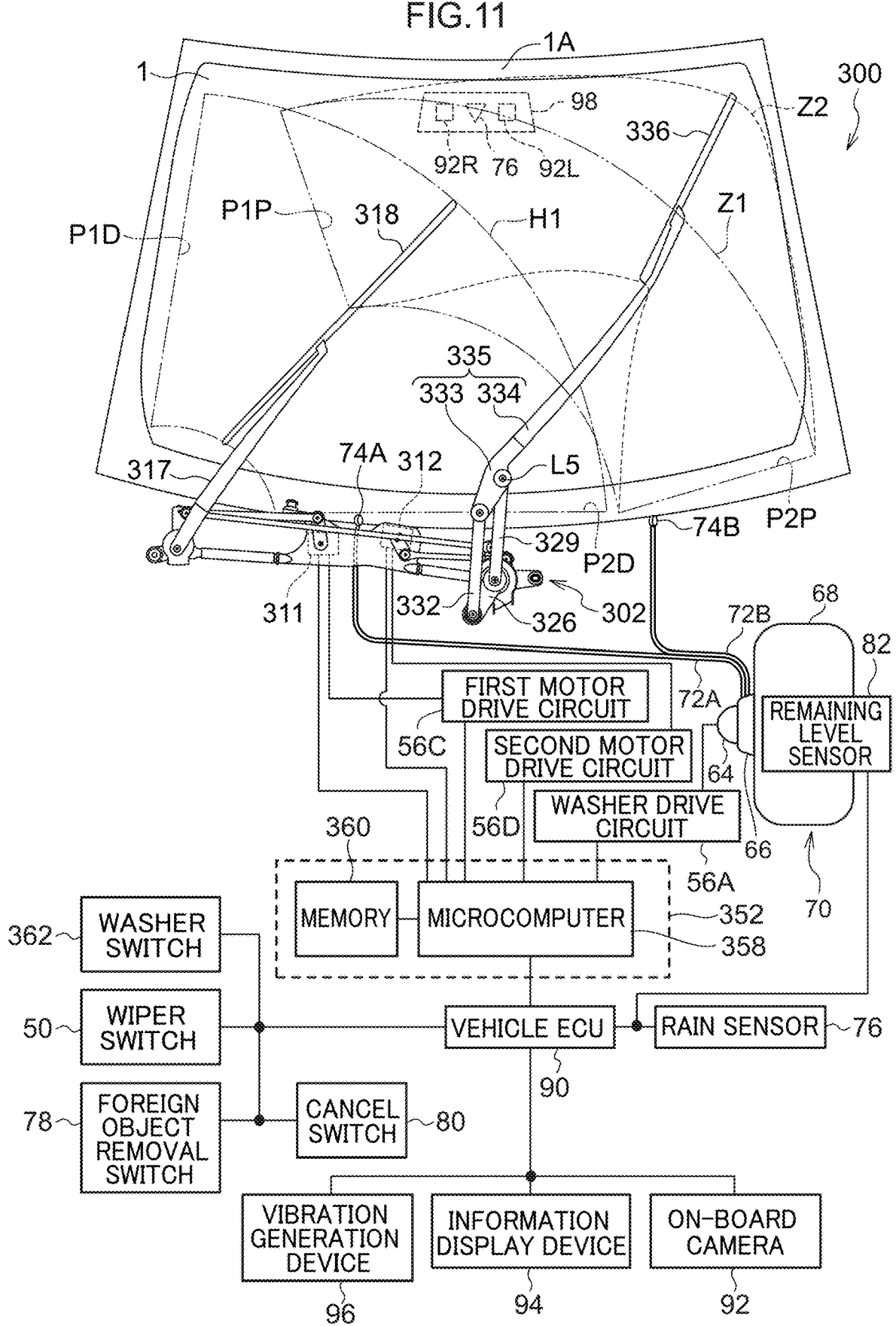
FIG. 11 is a schematic diagram illustrating configuration of a vehicle cleaning system according to a fourth exemplary embodiment of the present disclosure.

Explanation follows regarding a fourth exemplary embodiment of the present disclosure. FIG. 11 is a schematic diagram illustrating configuration of a vehicle cleaning system 300 according to the present exemplary embodiment. The vehicle cleaning system 300 illustrated in FIG. 11 differs from the first exemplary embodiment in that it is configured including a wiper device 302 including a pair of wiper arms (a driver's seat side wiper arm 317 and a front passenger seat side wiper arm 335, described later), a first motor 311, a second motor 312, a control circuit 352, a first motor drive circuit 56C, a second motor drive circuit 56D, and a washer switch 362. Other configurations are similar to those of the first exemplary embodiment, and these configurations are allocated the same reference numerals and detailed explanation thereof is omitted.

The first motor 311 is a drive source that rotates an output shaft forward and backward over a predetermined rotation angle range such that the driver's seat side wiper arm 317 and the front passenger seat side wiper arm 335 perform to-and-fro wiping actions over the windshield glass 1. In the present exemplary embodiment, when the first motor 311 rotates forward, a driver's seat side wiper blade 318 of the driver's seat side wiper arm 317 performs a wiping action from a lower return position P2D to an upper return position P1D, and a front passenger seat side wiper blade 336 of the front passenger seat side wiper arm 335 performs a wiping action from a lower return position P2P to an upper return position P1P. Moreover, when the first motor 311 rotates backward, the driver's seat side wiper blade 318 of the driver's seat side wiper arm 317 performs a wiping action from the upper return position P1D to the lower return position P2D, and the front passenger seat side wiper blade 336 of the front passenger seat side wiper arm 335 performs a wiping action from the upper return position P1P to the lower return position P2P.

When the second motor 312, described later, is not operating, the output shaft of the first motor 311 (a first output shaft 311A, described later) is rotated forward and rotated backward over a rotation angle between 0° and a predetermined rotation angle (referred to hereafter as a "first predetermined rotation angle"), such that the driver's seat side wiper blade 318 wipes a wiping range H1, and the front passenger seat side wiper blade 336 wipes a wiping range Z1.

The second motor 312 is a drive source that rotates an output shaft (a second output shaft 312A, described later) of the second motor 312 forward and backward over a rotation angle between 0° and a predetermined rotation angle (referred to hereafter as a "second predetermined rotation angle"), in order to give the appearance of extending the front passenger seat side wiper arm 335. Operating the second motor 312 while the above-described first motor 311 is in operation gives the appearance of extending the front passenger seat side wiper arm 335 upward on the front passenger seat side, such that the front passenger seat side wiper blade 336 wipes a wiping range Z2. Moreover, changing the size of the second predetermined rotation angle enables the range of the extension of the front passenger seat side wiper arm 335 to be adjusted. For example, setting a large second predetermined rotation angle increases the range of the extension of the front passenger seat side wiper arm 335, and setting a small second predetermined rotation angle decreases the range of the extension of the front passenger seat side wiper arm 335.

The first motor 311 and the second motor 312 are motors capable of being controlled such that the output shafts thereof rotate forward or rotate backward, and the rotation speeds of the output shafts are also capable of being controlled. For example, the first motor 311 and the second motor 312 may be either brushed or brushless motors. In cases in which the first motor 311 or the second motor 312 is configured by a brushed motor, the first motor drive circuit 56C or the second motor drive circuit 56D includes a circuit similar to the voltage generation circuit 56BH configured by an H bridge circuit as illustrated in FIG. 2. In cases in which the first motor 311 or the second motor 312 is a brushless motor, the first motor drive circuit 56C or the second motor drive circuit 56D includes a circuit similar to the voltage generation circuit 56BI configured by a three-phase inverter as illustrated in FIG. 3.

The control circuit 352 is connected to the first motor 311 and the second motor 312 so as to control the rotation of the first motor 311 and the second motor 312. For example, the control circuit 352 according to the present exemplary embodiment computes duty ratios of voltages to be applied to the first motor 311 and the second motor 312 based on the rotation directions, rotation positions, rotation speeds, and rotation angles of the output shafts of the first motor 311 and the second motor 312, as detected by absolute angle sensors (not illustrated in the drawings), serving as rotation angle detectors, provided close to terminal ends of the output shafts of the first motor 311 and the second motor 312.

In the present exemplary embodiment, the voltages respectively applied to the first motor 311 and the second motor 312 are generated by PWM that modulates a pulse waveform by using a switching element to switch a voltage (approximately 12V) of an onboard battery, serving as a power source, ON and OFF. The first motor drive circuit 56C generates a voltage to be applied to the first motor 311 by switching a switching element ON and OFF in the first motor drive circuit 56C according to a duty ratio computed by the control circuit 352 for the first motor 311, and applies the generated voltage to a coil terminal of the first motor 311. The second motor drive circuit 56D generates a voltage to be applied to the second motor 312 according to a duty ratio computed by the control circuit 352 for the second motor 312, and applies the generated voltage to a coil terminal of the second motor 312.

Since the first motor 311 and the second motor 312 according to the present exemplary embodiment each include a speed reduction mechanism configured by a worm gear, the rotation directions, rotation speeds, and rotation angles of the respective output shafts are not the same as the rotation speeds and rotation angles of a main body of the first motor 311 and a main body of the second motor 312. However, in the present exemplary embodiment, each motor and its speed reduction mechanism are configured as a single inseparable unit, and so hereafter the rotation speeds and rotation angles of the output shafts of the first motor 311 and the second motor 312 are taken as being synonymous with the rotation directions, rotation speeds, and rotation angles of the first motor 311 and the second motor 312 respectively.

The absolute angle sensors are, for example, provided within the speed reduction mechanisms of the first motor 311 and the second motor 312, and are sensors that convert the magnetic fields (magnetic force) of an excitation coil or magnet rotating together with the respective output shaft into current and detect this current. For example, the absolute angle sensors are magnetic sensors such as MR sensors.

The control circuit 352 includes a microcomputer 358 that is capable of computing the position of the driver's seat side wiper blade 318 on the windshield glass 1 based on the rotation angle of the output shaft of the first motor 311, as detected by the absolute angle sensor provided close to the terminal end of the output shaft of the first motor. The microcomputer 358 controls the first motor drive circuit 56C and the second motor drive circuit 56D so as to change the rotation speed of the output shaft of the first motor 311 according to the computed position.

The microcomputer 358 also computes the position of the front passenger seat side wiper blade 336 on the windshield glass 1 based on the rotation angle of the output shaft of the first motor 311, as detected by the absolute angle sensor provided close to the terminal end of the output shaft of the first motor 311, and controls the second motor drive circuit 56D so as to change the rotation speed of the output shaft of the second motor 312 according to the computed position. The microcomputer 358 also computes a level of extension of the front passenger seat side wiper arm 335 based on the rotation angle of the output shaft of the second motor 312 as detected by the absolute angle sensor provided close to the terminal end of the output shaft of the second motor 312.

The control circuit 352 is provided with memory 360, this being a storage device stored with data and a program employed in controlling the washer drive circuit 56A, the first motor drive circuit 56C, and the second motor drive circuit 56D. The memory 360 is stored with data and a program used to compute rotation speeds and the like (including the rotation angles) of the output shafts of the first motor 311 and the second motor 312 according to the rotation angle of the output shaft of the first motor 311, this representing the positions of the driver's seat side wiper blade 318 and the front passenger seat side wiper blade 336 on the windshield glass 1.

The vehicle ECU 90 that performs overall control of the vehicle engine and the like similarly to in the first exemplary embodiment is also connected to the microcomputer 358. Similarly to in the first exemplary embodiment, the wiper switch 50, the washer switch 362, the rain sensor 76, the foreign object removal switch 78 used to set a foreign object removal mode to automatically spray washer fluid when a foreign object such as dirt has been detected on the windshield glass 1, the cancel switch 80 to cancel automatic spraying of washer fluid, the remaining level sensor 82 to detect the amount of remaining washer fluid in the washer tank 68, the on-board camera 92 to image ahead of the vehicle, the information display device 94 including the instrument panel, audio output device, and HUD, and the vibration generation device 96 to vibrate the driver's seat are also connected to the vehicle ECU 90.

In the present exemplary embodiment, the wiper switch 50 may be separately provided with an elongated mode switch to change the wiping range of the front passenger seat side wiper blade 336 to the wiping range Z2. When the elongated mode switch is switched ON, a predetermined signal is input to the microcomputer 358 through the vehicle ECU 90. When input with the predetermined signal, for example the microcomputer 358 controls the second motor 312 so as to wipe the wiping range Z2 when the front passenger seat side wiper blade 336 performs a wiping action from the lower return position P2P to the upper return position P1P.

The washer switch 362 is a switch used to switch ON or OFF power supplied from the vehicle battery to the washer motor 64, the first motor 311, and the second motor 312. For example, the washer switch 362 is integrally provided to an operation means such as a lever provided to the wiper switch 50 previously described, and is switched ON by an operation such as the occupant pulling the lever toward them. When the washer switch 362 is switched ON, the microcomputer 358 actuates the washer motor 64 and the first motor 311. The microcomputer 358 also controls the second motor 312 such that the front passenger seat side wiper blade 336 wipes over the wiping range Z2 when the front passenger seat side wiper blade 336 wipes from the lower return position P2P to the upper return position P1P, and such that the front passenger seat side wiper blade 336 wipes over the wiping range Z1 when the front passenger seat side wiper blade 336 wipes from the upper return position P1P to the lower return position P2P. This control enables the front passenger seat side of the windshield glass 1 to be wiped over a wide area.

While the washer switch 362 is ON, similarly to in the first exemplary embodiment, rotation of the washer motor 64 provided to the washer device 70 drives the washer pump 66. The washer pump 66 conveys washer fluid under pressure from the washer tank 68 to the driver's seat side hose 72A and the front passenger seat side hose 72B. The driver's seat side hose 72A is connected to the driver's seat side nozzle 74A provided beneath the windshield glass 1 on the driver's seat side. The front passenger seat side hose 72B is connected to the front passenger seat side nozzle 74B provided beneath the windshield glass 1 on the front passenger seat side. The washer fluid that has been conveyed under pressure is sprayed onto the windshield glass 1 from the driver's seat side nozzle 74A and the front passenger seat side nozzle 74B. Washer fluid that has landed on the windshield glass 1 is wiped away, together with dirt on the windshield glass 1, by the action of the driver's seat side wiper blade 318 and the front passenger seat side wiper blade 336.

The microcomputer 358 performs control such that the washer motor 64 is only actuated while the washer switch 362 is ON. The microcomputer 358 also controls the first motor 311 such that even when the washer switch 362 has been switched OFF, the action of the driver's seat side wiper blade 318 and the front passenger seat side wiper blade 336 continues until they reach the lower return positions P2D, P2P. The microcomputer 358 also controls the second motor 312 such that if the washer switch 362 is switched OFF while the driver's seat side wiper blade 318 and the front passenger seat side wiper blade 336 are wiping toward the upper return positions P1D, P1P, the wiping range Z2 is wiped until the driver's seat side wiper blade 318 and the front passenger seat side wiper blade 336 rotated by the first motor 311 reach the upper return positions P1D, P1P.

Explanation follows regarding configuration of the wiper device 302 according to the present exemplary embodiment, with reference to FIG. 12 to FIG. 16. As illustrated in FIG. 12 to FIG. 16, the wiper device 302 according to the present exemplary embodiment includes a frame-shaped central frame 303, and a pair of pipe frames 304, 305 that are each fixed to the central frame 303 at one end portion, and extend from the central frame 303 toward one or the other vehicle width direction side. Another end portion of the pipe frame 304 is formed with a first holder member 306 that includes a driver's seat side pivot shaft 315 and so on of the driver's seat side wiper arm 317. Another end portion of the pipe frame 305 is formed with a second holder member 307 that includes a second front passenger seat side pivot shaft 322 and so on of the front passenger seat side wiper arm 335. The wiper device 302 is supported on the vehicle at a support portion 303A provided to the central frame 303, and is fixed to the vehicle by fastening to the vehicle using bolts and the like at a fixing portion 306A of the first holder member 306 and at a fixing portion 307A of the second holder member 307.

The first motor 311 and the second motor 312 that drive the wiper device 302 are provided to the wiper device 302 at a back face of the central frame 303 (at a face that faces into the vehicle cabin). The first output shaft 311A of the first motor 311 passes through the central frame 303 and projects from a front face of the central frame 303 (a face that faces toward the outside of the vehicle). One end of a first drive crank arm 313 is fixed to a leading end portion of the first output shaft 311A. The second output shaft 312A of the second motor 312 passes through the central frame 303 and projects from the front face of the central frame 303. One end of a second drive crank arm 314 is fixed to a leading end portion of the second output shaft 312A.

The driver's seat side pivot shaft 315 is rotatably supported by the first holder member 306. One end of a driver's seat side swing lever 316 is fixed to a base end portion of the driver's seat side pivot shaft 315 (on the far side in FIG. 12), and an arm head of the driver's seat side wiper arm 317 is fixed to a leading end portion of the driver's seat side pivot shaft 315 (on the near side in FIG. 12). As illustrated in FIG. 11, the driver's seat side wiper blade 318 for wiping the driver's seat side of the windshield glass 1 is coupled to a leading end portion of the driver's seat side wiper arm 317.

The other end of the first drive crank arm 313 and the other end of the driver's seat side swing lever 316 are coupled together through a first coupling rod 319. When the first motor 311 is driven, the first drive crank arm 313 rotates, and this rotation force is transmitted through the first coupling rod 319 to the driver's seat side swing lever 316, causing the driver's seat side swing lever 316 to swing. Swinging the driver's seat side swing lever 316 also swings the driver's seat side wiper arm 317, such that the driver's seat side wiper blade 318 wipes the wiping range H1 between the lower return position P2D and the upper return position P1D.

Figure 12:
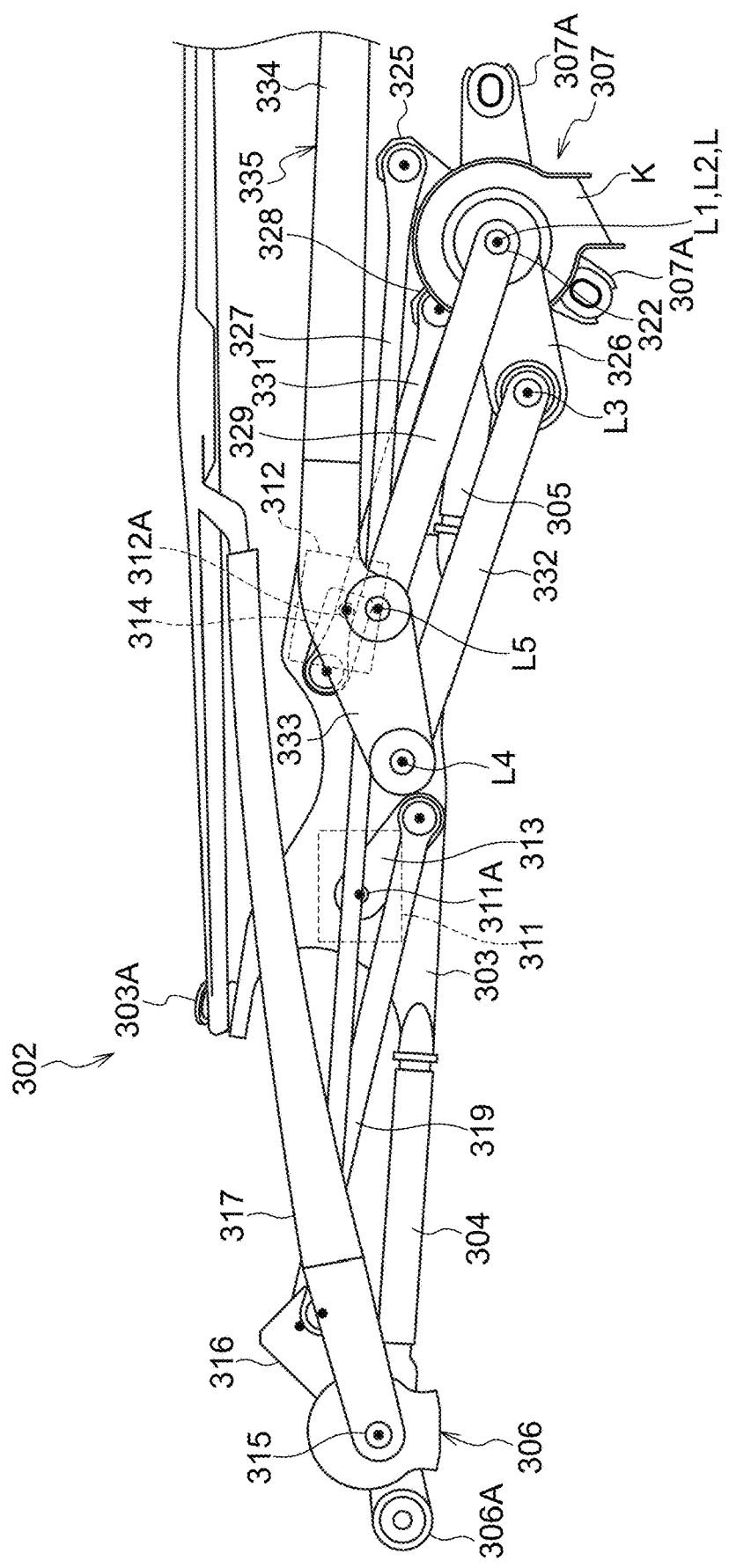
FIG. 12 is a plan view illustrating a stopped state of a wiper device according to the fourth exemplary embodiment of the present disclosure.

At the second holder member 307 protected by a waterproof cover K, one end of a first front passenger seat side swing lever 325 and one end of a first drive lever 326 are respectively fixed to a base end portion and a leading end portion of a first shaft member configured capable of pivoting on a first axis L1, and the one end of the first front passenger seat side swing lever 325 and the one end of the first drive lever 326 are respectively supported so as to be capable of rotating about the first axis L1. Moreover, one end of a second front passenger seat side swing lever 328 and one end of a second drive lever 329 are respectively fixed to a base end portion and a leading end portion of a second shaft member configured capable of pivoting about a second axis L2, and the one end of the second front passenger seat side swing lever 328 and the one end of the second drive lever 329 are supported so as to be capable of rotating about the second axis L2. In the present exemplary embodiment, the first axis L1 and the second axis L2 are disposed on the same straight line L (are coaxial). As illustrated in FIG. 12, the other end of the first front passenger seat side swing lever 325 and the other end of the driver's seat side swing lever 316 are coupled together by a second coupling rod 327. Accordingly, when the first motor 311 is driven so as to swing the driver's seat side swing lever 316, the second coupling rod 327 transmits drive force to the first front passenger seat side swing lever 325, and the first drive lever 326 is swung (rotated) about the first axis L1 together with the first front passenger seat side swing lever 325.

The other end of the second drive crank arm 314 and the other end of the second front passenger seat side swing lever 328 are coupled together by a third coupling rod 331. Accordingly, when the second motor 312 is driven, the second drive crank arm 314 rotates, and the third coupling rod 331 transmits drive force of the second drive crank arm 314 to the second front passenger seat side swing lever 328, such that the second drive lever 329 swings (rotates) together with the second front passenger seat side swing lever 328. As described above, the first shaft member and the second shaft member are provided coaxially to one another. However, movements of the first shaft member and the second shaft member are not coupled, and therefore the first shaft member and the second shaft member rotate independently of each other on the same straight line L (coaxially).

As illustrated in FIG. 12 to FIG. 16, the wiper device 302 includes a first following lever 332. A base end portion of the first following lever 332 is coupled to the other end side of the first drive lever 326 so as to be capable of rotating about a third axis L3.

The wiper device 302 also includes an arm head 333 configuring a second following lever. A base end portion of the arm head 333 is coupled to a leading end side of the first following lever 332 so as to be capable of rotating about a fourth axis L4. A leading end side of the arm head 333 is coupled to the other end side of the second drive lever 329 so as to be capable of rotating about a fifth axis L5. The arm head 333 configures the front passenger seat side wiper arm 335 together with a retainer 334. A base end portion of the retainer 334 is fixed to the leading end of the arm head 333. The front passenger seat side wiper blade 336 that wipes the front passenger seat side of the windshield glass 1 is coupled to a leading end portion of the front passenger seat side wiper arm 335.

The first drive lever 326, the second drive lever 329, the first following lever 332, and the arm head 333 are coupled such that a length from the first axis L1 (second axis L2) to the third axis L3 is the same as a length from the fourth axis L4 to the fifth axis L5. The first drive lever 326, the second drive lever 329, the first following lever 332, and the arm head 333 are also coupled such that a length from the third axis L3 to the fourth axis L4 is the same as a length from the first axis L1 (second axis L2) to the fifth axis L5. Accordingly, the first drive lever 326 and the arm head 333 are retained parallel to each other, and the second drive lever 329 and the first following lever 332 are retained parallel to each other. The first drive lever 326, the second drive lever 329, the first following lever 332, and the arm head 333 configure a link mechanism (extension-contraction mechanism) that has a substantially parallelogram shape.

Figure 13:
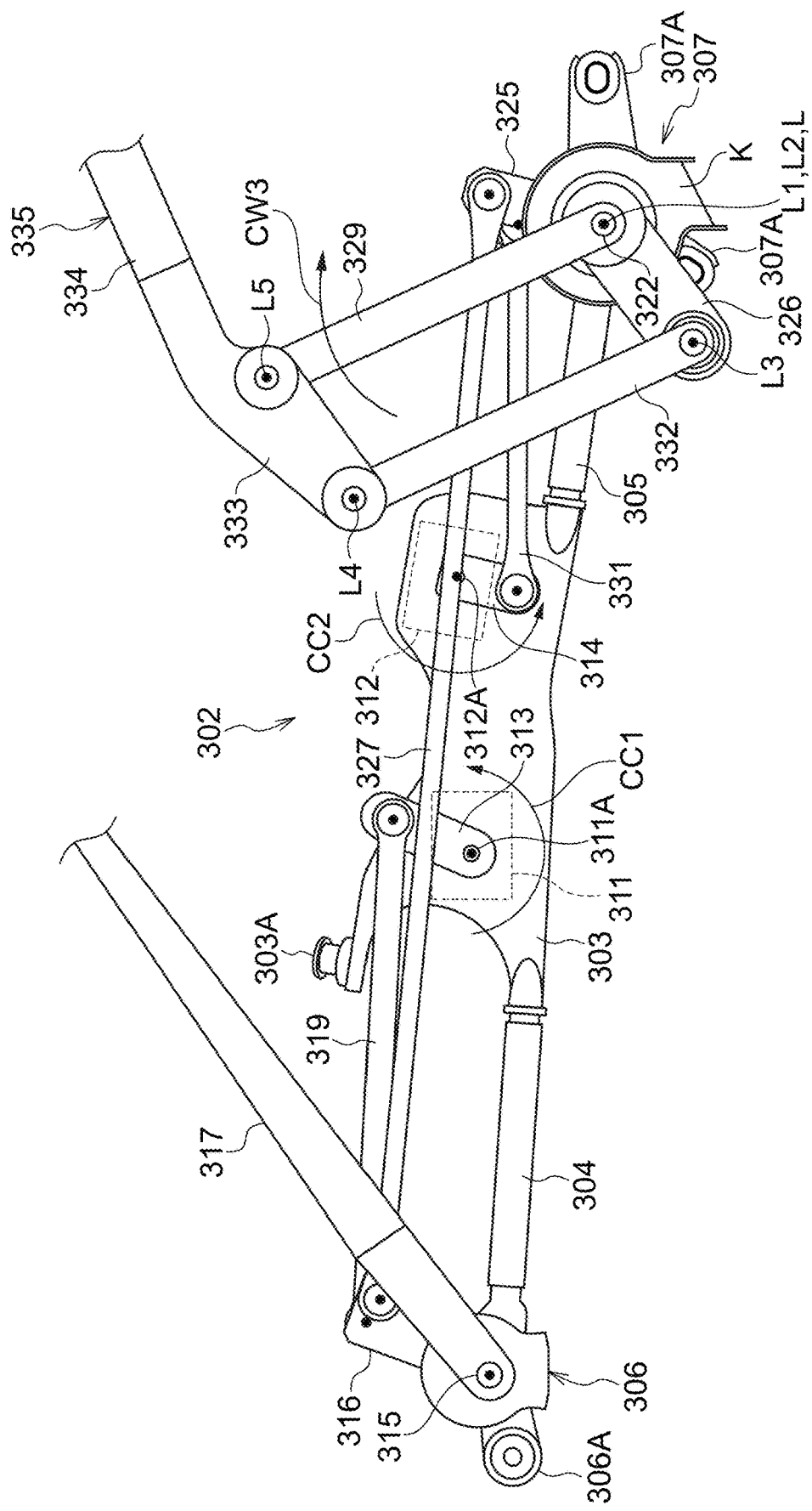
FIG. 13 is a plan view illustrating progress of an action of a vehicle wiper device according to the fourth exemplary embodiment of the present disclosure.
Figure 14:
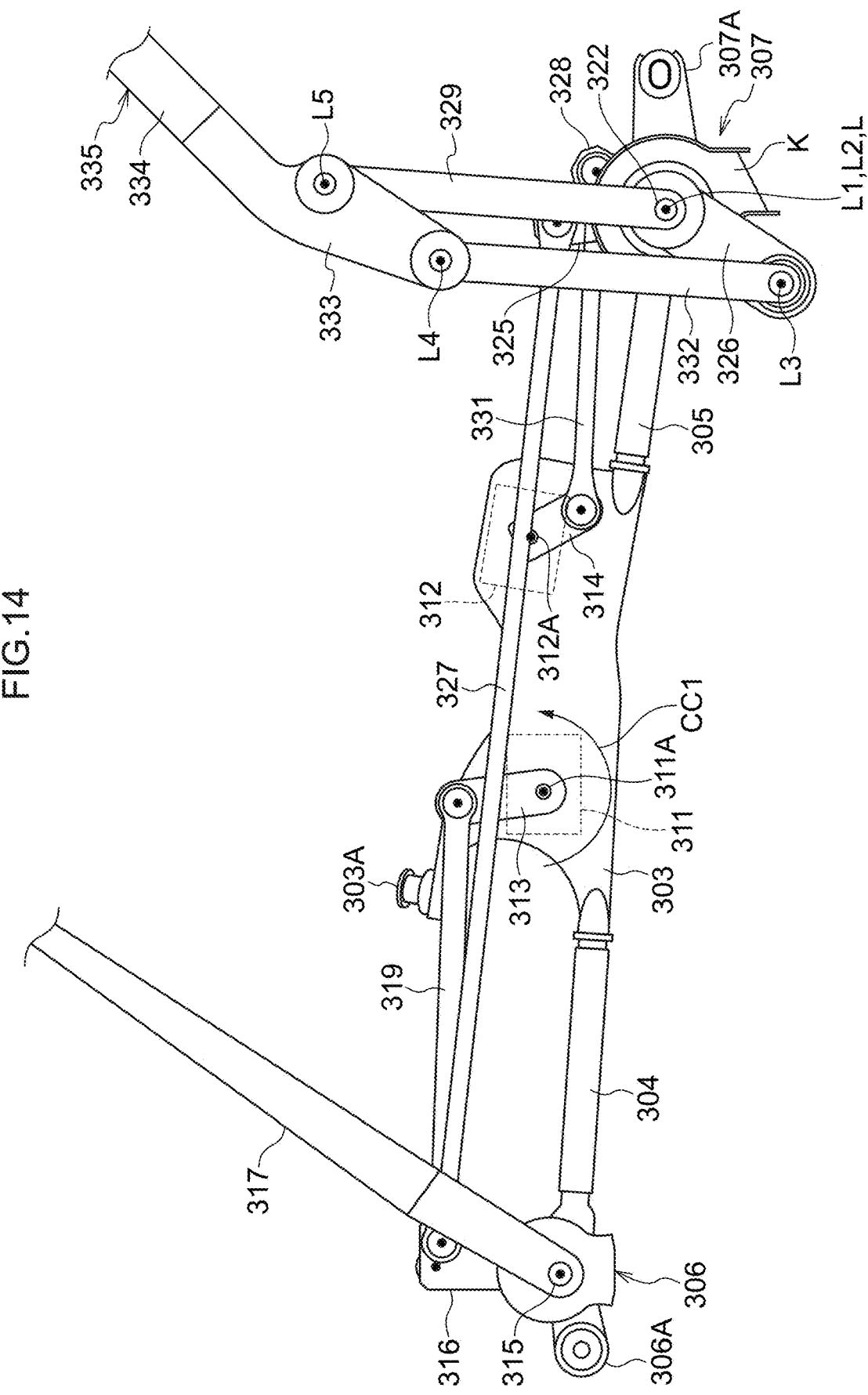
FIG. 14 is a plan view illustrating progress of an action of a vehicle wiper device according to the fourth exemplary embodiment of the present disclosure.
Figure 15:
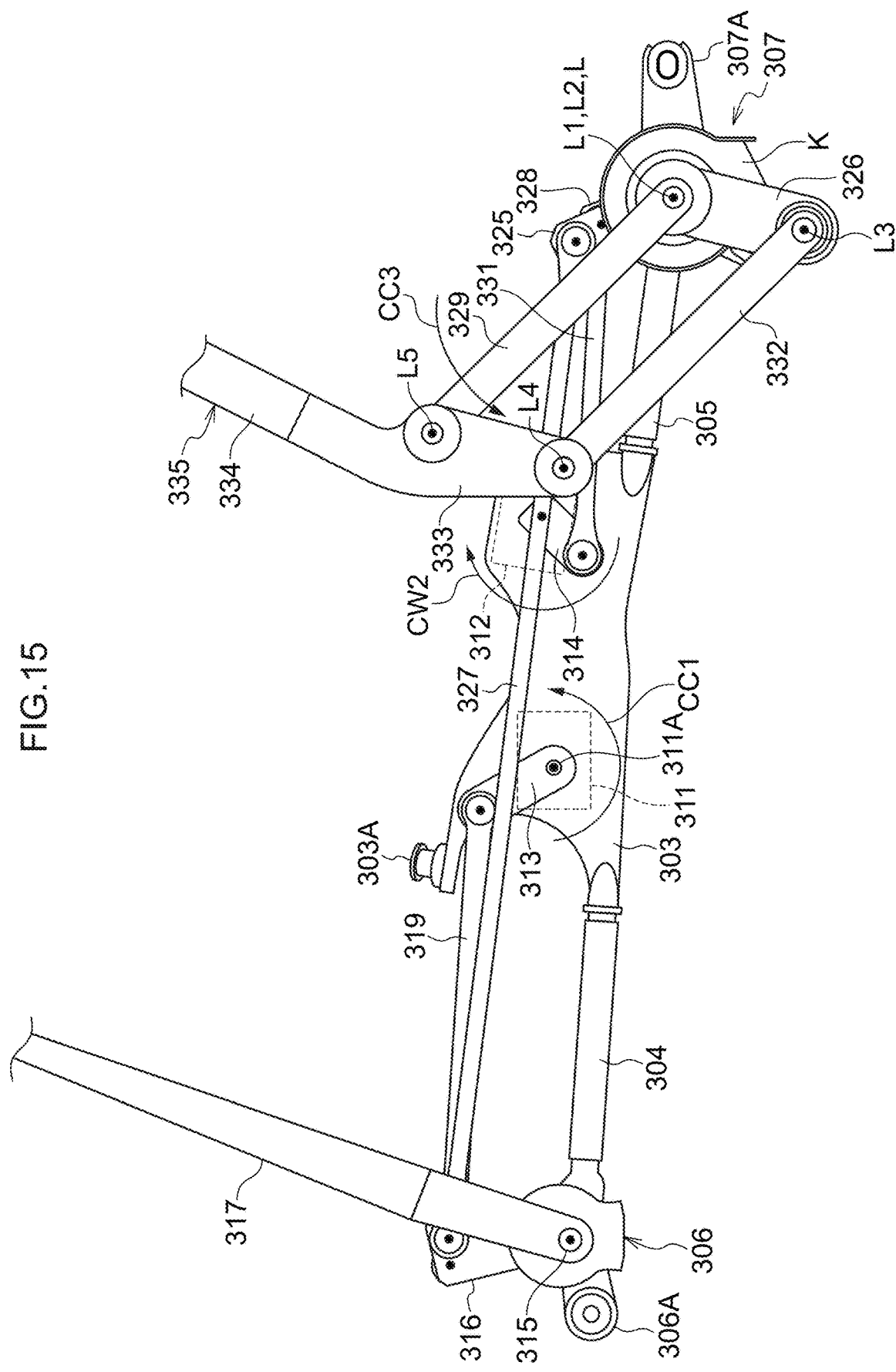
FIG. 15 is a plan view illustrating progress of an action of a vehicle wiper device according to the fourth exemplary embodiment of the present disclosure.

The fifth axis L5 is a pivot point for the action of the front passenger seat side wiper arm 335. The front passenger seat side wiper arm 335 performs a to-and-fro action over the windshield glass 1 by being rotated about the fifth axis L5 by drive force from the first motor 311. As illustrated in FIG. 13 to FIG. 15, via the substantially parallelogram shaped link mechanism configured by the first drive lever 326, the second drive lever 329, the first following lever 332, and the arm head 333, the second motor 312 moves the fifth axis L5 to a higher position on the windshield glass 1 than the position illustrated in FIG. 12 and FIG. 16. The front passenger seat side wiper arm 335 appears to extend due to this movement of the fifth axis L5. When both the first motor 311 and the second motor 312 are in operation, the front passenger seat side wiper blade 336 wipes the wiping range Z2.

Figure 16:
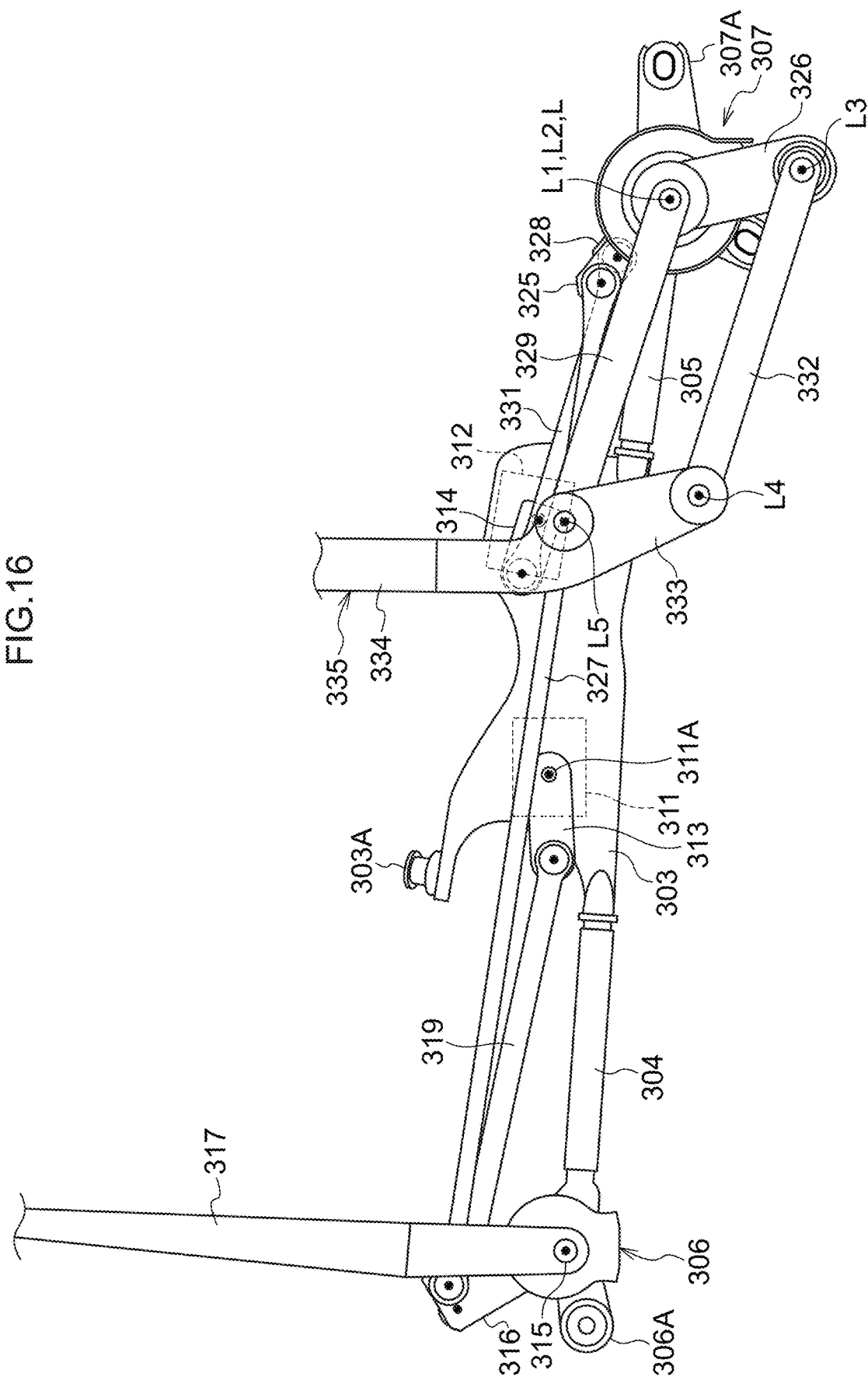
FIG. 16 is a plan view illustrating progress of an action of a vehicle wiper device according to the fourth exemplary embodiment of the present disclosure.

When the second motor 312 is not operated and the first motor 311 operates on its own, the fifth axis L5 does not move from the position illustrated in FIG. 12 and FIG. 16 (referred to hereafter as a "first position"). Accordingly, the front passenger seat side wiper arm 335 performs an action between the lower return position P2P and the upper return position P1P so as to describe a substantially circular arc shaped trajectory centered on the fifth axis L5 that has a position that does not change, and the front passenger seat side wiper blade 336 wipes the substantially fan-shaped wiping range Z1.

In the present exemplary embodiment, when it is necessary to wipe the windshield glass 1 over a broad area, as the front passenger seat side wiper blade 336 performs an action on an outward path from the lower return position P2P toward the upper return position P1P, the first motor 311 and the second motor 312 are both controlled in order to wipe the wiping range Z2. When the front passenger seat side wiper blade 336 changes direction at the upper return position P1P and performs an action on a return path toward the lower return position P2P, the first motor 311 and the second motor 312 are both controlled in order to wipe the wiping range Z1. As the front passenger seat side wiper blade 336 wipes to-and-fro between the lower return position P2P and the upper return position P1P, the wiping range Z2 is wiped on the outward path and the wiping range Z1 is wiped on the return path, enabling the windshield glass 1 to be wiped over a broad range. Alternatively, wiping the wiping range Z1 on the outward path and wiping the wiping range Z2 on the return path as the front passenger seat side wiper blade 336 wipes to-and-fro between the lower return position P2P and the upper return position P1P also enables the windshield glass 1 to be wiped over a broad range. Alternatively, configuration may be made so as to wipe the wiping range Z2 on both the outward path and the return path.

Explanation follows regarding operation of the wiper device 302 according to the present exemplary embodiment. In the present exemplary embodiment, the driver's seat side wiper arm 317 and the driver's seat side wiper blade 318 only perform an action about the driver's seat side pivot shaft 315 accompanying rotation of the first motor 311. Accordingly, in the following explanation, detailed explanation is given regarding actions of the front passenger seat side wiper arm 335 and the front passenger seat side wiper blade 336.

FIG. 12 illustrates a state in which the front passenger seat side wiper blade 336 is positioned at the lower return position P2P, and the front passenger seat side wiper arm 335 is at a stationary position. In this state, when the washer switch 62 previously described or the elongated mode switch has been switched ON, the first output shaft 311A of the first motor 311 is rotated in the rotation direction CC1 illustrated in FIG. 13 under the control of the control circuit 52 such that the first drive lever 326 starts to rotate and the front passenger seat side wiper arm 335 starts to perform a rotation action about the fifth axis L5. At the same time, the second output shaft 312A of the second motor 312 starts to rotate in the rotation direction CC2 illustrated in FIG. 13. Note that in the present exemplary embodiment, rotation of the first output shaft 311A in the rotation direction CC1 and rotation of the second output shaft 312A in the rotation direction CC2 correspond to forward rotation of the respective output shafts.

FIG. 13 illustrates a state in which the front passenger seat side wiper blade 336 has wiped partway (approximately one quarter of the outward journey) across the windshield glass 1. In the present exemplary embodiment, when the first motor 311 starts to rotate in the rotation direction CC1, drive force from the rotation direction CC2 rotation of the second motor 312 is transmitted to the second drive lever 329. The drive force of the second motor 312 transmitted to the second drive lever 329 causes the second drive lever 329 perform an action in an action direction CW3, such the fifth axis L5 configuring the pivot point of the front passenger seat side wiper arm 335 moves upward on the front passenger seat side of the windshield glass 1.

FIG. 14 illustrates a case in which the first output shaft 311A has rotated to an intermediate rotation angle between 0° and the first predetermined angle, thereby further rotating the first drive lever 326 such that the front passenger seat side wiper blade 336 reaches a substantially intermediate point on the journey (outward journey) between the lower return position P2P and the upper return position P1P. In FIG. 14, the second output shaft 312A of the second motor 312 is in a state rotated in the rotation direction CC2 in FIG. 13 as far as the second predetermined rotation angle. The forward rotation of the second output shaft 312A has reached its maximum rotation angle, such that the fifth axis L5 configuring the pivot point of the front passenger seat side wiper arm 335 is lifted up to its highest position (second position) by the second drive crank arm 314, the third coupling rod 331, the second front passenger seat side swing lever 328, and the second drive lever 329. As a result, the leading end portion of the front passenger seat side wiper blade 336 is moved to a position close to an upper corner on the front passenger seat side of the windshield glass 1, as illustrated in FIG. 11. Note that although the intermediate rotation angle described above is approximately half of the first predetermined rotation angle, this is set on a case-by-case basis according to the shape of the windshield glass 1 and the like. The second position is a position where the fifth axis L5 is disposed at its highest position for each elongation ratio. More specifically, the second position is a position where the fifth axis L5 is disposed when the first output shaft 311A has rotated to the intermediate rotation angle between 0° and the first predetermined angle as the front passenger seat side wiper blade wipes a broader range than the wiping range Z1 (for example the wiping range Z2).

FIG. 15 illustrates a case in which the first drive lever 326 has rotated further, such that the front passenger seat side wiper blade 336 has covered approximately three-quarters of the journey (outward journey) between the lower return position P2P and the upper return position P1P. In FIG. 15, the rotation direction of the first output shaft 311A of the first motor 311 is the same as that illustrated in FIG. 13 and FIG. 14. However, the second output shaft 312A of the second motor 312 is rotating in a rotation direction CW2 (backward rotation), this being the opposite rotation direction to that illustrated in FIG. 13 and FIG. 14. Since the second output shaft 312A is rotating in the rotation direction CW2, the second drive lever 329 performs an action in an action direction CC3, and the fifth axis L5 configuring the pivot point of the front passenger seat side wiper arm 335 moves downward from the second position. As a result, the leading end portion of the front passenger seat side wiper blade 336 moves across the windshield glass 1 so as to describe the trajectory illustrated by dashed lines at the top of the wiping range Z2 in FIG. 11, thereby wiping the wiping range Z2.

FIG. 16 illustrates a case in which the first output shaft 311A of the first motor 311 has rotated forward as far as the first predetermined rotation angle, and the second output shaft 312A of the second motor 312 has rotated backward by the second predetermined rotation angle. The first output shaft 311A of the first motor 311 has reached its maximum forward rotation angle, and therefore the driver's seat side wiper arm 317 and the driver's seat side wiper blade 318 reach the upper return position P1D. The second output shaft 312A of the second motor 312 has rotated backward by the second predetermined rotation angle from the state illustrated in FIG. 14 (a state in which the second output shaft 312A has rotated forward and reached the second predetermined rotation angle), such that the fifth axis L5 configuring the pivot point of the front passenger seat side wiper arm 335 has returned to the first position illustrated in FIG. 16, this being its position prior to the second output shaft 312A of the second motor 312 starting to rotate forward. As a result, the front passenger seat side wiper arm 335 and the front passenger seat side wiper blade 336 reach the same upper return position P1P as that of the wiping range Z1 that is wiped when the second motor 312 is not driven.

In the present exemplary embodiment, the position of the driver's seat side wiper blade 318 between the lower return position P2D and the upper return position P1D can be computed from the rotation angle of the first output shaft 311A of the first motor 311. Moreover, the level of the apparent extension (level of elongation) of the front passenger seat side wiper arm 335 can be computed from the rotation angle of the second output shaft 312A of the second motor 312. The microcomputer 358 controls the rotation angle of the second output shaft 312A based on the position of the driver's seat side wiper blade 318 between the lower return position P2D and the upper return position P1D as computed from the rotation angle of the first output shaft 311A, in order to align the action of the first motor 311 and the action of the second motor 312. For example, the memory 360 is pre-stored with a map (for example, a second output shaft rotation angle map, described below) in which positions of the driver's seat side wiper blade 318 between the lower return position P2D and the upper return position P1D (or rotation angles of the first output shaft 311A) are associated with rotation angles of the second output shaft 312A. The rotation angle of the second output shaft 312A is controlled according to the rotation angle of the first output shaft 311A based on this map.

Figure 17:
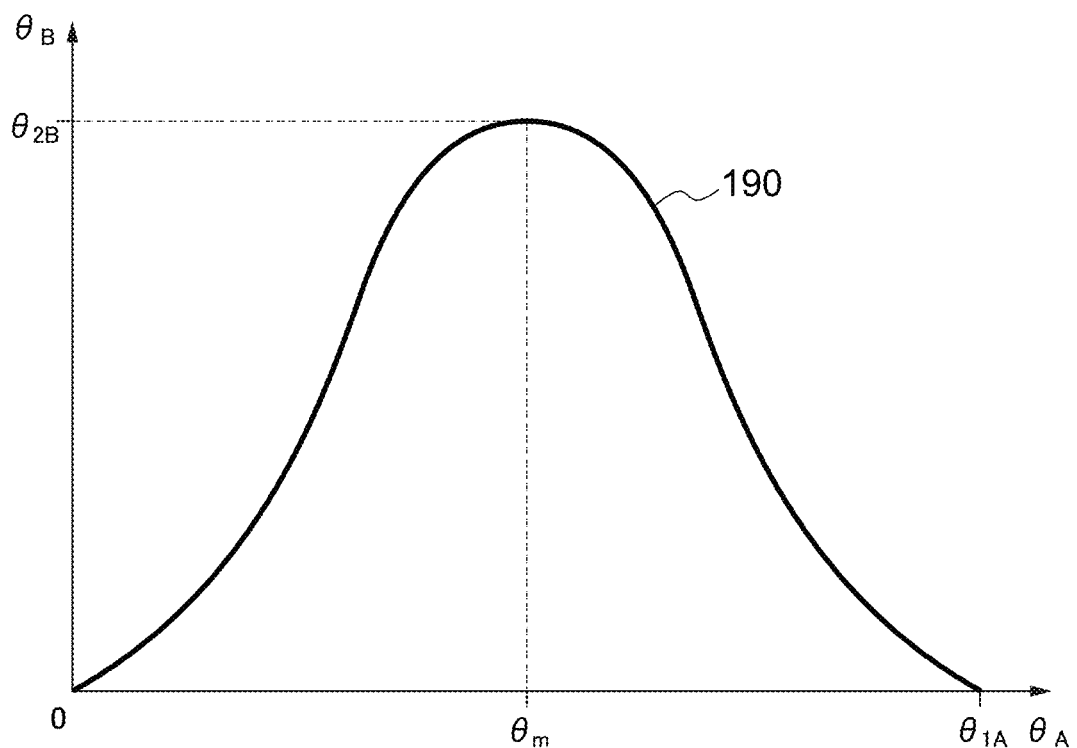
FIG. 17 is a schematic diagram illustrating an example of a second output shaft rotation angle map defining rotation angles of a second output shaft according to rotation angles of a first output shaft in the fourth exemplary embodiment of the present disclosure.

FIG. 17 illustrates an example of the second output shaft rotation angle map defining rotation angles of the second output shaft 312A according to rotation angles of the first output shaft 311A of the present exemplary embodiment. The horizontal axis in FIG. 17 represents a first output shaft rotation angle $\theta_A$, this being the rotation angle of the first output shaft 311A, and the vertical axis in FIG. 17 represents a second output shaft rotation angle $\theta_B$, this being the rotation angle of the second output shaft 312A. The origin O in FIG. 17 represents a state in which the front passenger seat side wiper blade 336 is at the lower return position P2P. $\theta_{1A}$ in FIG. 17 represents a state in which the front passenger seat side wiper blade 336 is at the upper return position P1P as a result of the first output shaft 311A having rotated by a first predetermined rotation angle $\theta_{1A}$.

When the absolute angle sensor provided close to the terminal end of the first output shaft 311A detects that rotation of the first output shaft 311A of the first motor 311 has started, the microcomputer 358 cross references the rotation angle of the first output shaft 311A as detected by the absolute angle sensor against the second output shaft rotation angle map. By this cross referencing, the second output shaft rotation angle $\theta_B$ corresponding to the first output shaft rotation angle $\theta_A$ detected by the absolute angle sensor is computed based on the angle indicated by the curve 190 in FIG. 17, and the rotation angle of the second output shaft 312A of the second motor 312 is controlled so as to become the computed second output shaft rotation angle $\theta_B$.

More specifically, when the rotation angle of the first output shaft 311A of the first motor 311, detected by the absolute angle sensor provided close to the terminal end of the first output shaft 311A, starts to change in the forward rotation direction from 0°, the microcomputer 358 determines that the front passenger seat side wiper blade 336 has started to move from the lower return position P2P, and starts forward rotation of the second output shaft 312A. As described above, the microcomputer 358 uses the second output shaft rotation angle map to decide the rotation angle of the second output shaft 312A according to the rotation angle of the first output shaft 311A, and the microcomputer 358 monitors the rotation angle of the second output shaft 312A based on signals from the absolute angle sensor provided close to the terminal end of the second output shaft 312A, and controls the rotation of the second motor 312 so as to become the rotation angle decided using the second output shaft rotation angle map. Although this will depend on the settings of the second output shaft rotation angle map, as illustrated in FIG. 17, the forward rotation angle of the second output shaft 312A is made to become a second predetermined rotation angle $\theta_{2B}$ when the first output shaft rotation angle $\theta_A$ is an intermediate rotation angle $\theta_m$ between 0° and the first predetermined rotation angle $\theta_{1A}$. Bringing the forward rotation angle of the second output shaft 312A to the second predetermined rotation angle $\theta_{2B}$ moves the fifth axis L5 configuring the pivot point of the front passenger seat side wiper arm 335 upward (to the second position) on the front passenger seat side of the windshield glass 1.

After the forward rotation angle of the second output shaft 312A has reached the second predetermined rotation angle $\theta_{2B}$, the rotation angle of the second output shaft 312A is reduced based on the second output shaft rotation angle map. Specifically, the second output shaft 312A is rotated backward by the second predetermined rotation angle $\theta_{2B}$ until the rotation angle of the first output shaft 311A reaches the first predetermined rotation angle $\theta_{1A}$, and the front passenger seat side wiper blade 336 reaches the upper return position P1P, thereby reducing the rotation angle of the second output shaft 312A to 0°. This backward rotation of the second output shaft 312A returns the fifth axis L5 configuring the pivot point of the front passenger seat side wiper arm 335 to its original position (the first position).

A case in which the wiping range Z2 is wiped as the front passenger seat side wiper blade 336 is moved from the lower return position P2P toward the upper return position HP has been described above. In cases in which the wiping range Z2 is wiped as the front passenger seat side wiper blade 336 is moved from the upper return position PH' to the lower return position P2P, when the rotation angle of the first output shaft 311A, detected by the absolute angle sensor provided close to the terminal end of the first output shaft 311A, starts to change in the backward rotation direction from 0°, the front passenger seat side wiper blade 336 is determined to have started moving away from the upper return position PIP, and forward rotation of the second output shaft 312A of the second motor 312 is started. Note that although the curve 190 has left-right symmetry about the intermediate rotation angle $\theta_m$ in the second output shaft rotation angle map illustrated in FIG. 17, there is no limitation thereto. The curve of the map is set on a case-by-case basis according to such factors as the shape of the windshield glass 1.

In the present exemplary embodiment, at step 412 of the foreign object removal processing illustrated in FIG. 4, the second output shaft rotation angle map illustrated in FIG. 17 is employed in control to synchronize rotation of the second motor 312 with rotation of the first motor 311, thereby enabling the entirety of the functional area 98 where the on-board camera 92 is provided to be effectively wiped by the front passenger seat side wiper blade 336.

According to the present exemplary embodiment, when a water droplet or a foreign object such as dirt is detected on the surface of the windshield glass 1 and the windshield glass 1 is cleaned automatically by spraying washer fluid, the information display device 94 enables the fact that the washer device 70 is being actuated automatically to be perceived visually and audibly, and the vibration generation device 96 also attracts the attention of the user by vibrating the driver's seat. This thereby enables automatic cleaning of the windshield glass 1 while suppressing user unease, and enables water droplets and foreign objects such as dirt to be prevented from obstructing the acquisition of image data by the on-board camera 92, this being necessary for automated driving and advanced driver-assistance.

In the present exemplary embodiment, the first output shaft 311A of the first motor 311 and the second output shaft 312A of the second motor 312 are controlled so as to allow both forward and backward (to-and-fro) rotation. However, there is no limitation thereto. For example, either one of the first output shaft 311A or the second output shaft 312A may be rotated in a single direction.

Note that in the present exemplary embodiment, the driver's seat side wiper blade 318 and the front passenger seat side wiper blade 336 are moved between the upper return positions P1D, P1P and the lower return positions P2D, P2P by rotation of the first output shaft 311A of the first motor 311. However, there is no limitation thereto. For example, a structure may be applied in which a driver's seat side first motor and a front passenger seat side first motor are provided as first motors 311, with rotation of the driver's seat side first motor moving the driver's seat side wiper blade 318 between the upper return position P1D and the lower return position P2D, and rotation of the front passenger seat side first motor moving the front passenger seat side wiper blade 336 between the upper return position P1P and the lower return position P2P.

Note that in the present exemplary embodiment, a structure is adopted in which the driver's seat side wiper blade 318 and the front passenger seat side wiper blade 336 do not overlap each other in the vehicle width direction when at the lower return positions P2D, P2P. However, there is no limitation thereto. For example, the driver's seat side wiper blade 318 side of the front passenger seat side wiper blade 336 may be set longer. In other words, the length of the front passenger seat side wiper blade 336 may be set such that the driver's seat side wiper blade 318 side of the front passenger seat side wiper blade 336 overlaps the front passenger seat side wiper blade 336 side of the driver's seat side wiper blade 318. This enables a non-wipeable region remaining at a central lower side of the windshield glass when wiping the wiping range Z2 in a to-and-fro action to be reduced in size.

Note that in the present exemplary embodiment, control is performed to extend the front passenger seat side wiper arm 335 (front passenger seat side wiper blade 336) up to the vicinity of an intermediate angle of the predetermined rotation angle of the first output shaft 311A, and to contract the front passenger seat side wiper arm 335 (front passenger seat side wiper blade 336) range from the vicinity of the intermediate angle to the predetermined rotation angle. However, there is no limitation thereto. For example, control may be performed to gradually extend the front passenger seat side wiper arm 335 as the front passenger seat side wiper blade 336 wipes from the lower return position P2P to the upper return position P1P (during to-and-fro wiping).

Note that in the present exemplary embodiment, explanation has been given regarding an example of an exemplary embodiment employing the rotation angle of the first output shaft 311A of the first motor 311 and the rotation angle of the second output shaft 312A of the second motor 312. Alternatively, the rotation position of the first output shaft 311A and the rotation position of the second output shaft 312A may be employed.

In the present exemplary embodiment, similarly to in the first exemplary embodiment, washer fluid is sprayed from the driver's seat side nozzle 74A and the front passenger seat side nozzle 74B. However, there is no limitation thereto. A functional area nozzle 74C may be provided to spray washer fluid toward the functional area 98 as in the second exemplary embodiment. Alternatively, opening spray nozzles 174A and closing spray nozzles 174B may be provided to leading end portions of the driver's seat side wiper arm 317 and the front passenger seat side wiper arm 335 as in the third exemplary embodiment.

The disclosure of Japanese Patent Application No. 2017-135736, filed on Jul. 11, 2017, is incorporated in its entirety by reference herein.

All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. A vehicle cleaning system comprising:
    a foreign object detector configured to detect a foreign object present on a windshield of a vehicle, the foreign object detector including a camera configured to acquire information about an image ahead of the vehicle through the windshield from inside a vehicle cabin of the vehicle and an infrared sensor configured to detect a water droplet on a surface of the windshield;
    a foreign object removal device configured to clean the windshield to remove the foreign object from the windshield, the foreign object removal device including a washer device configured to spray cleaning fluid toward the windshield, a wiper device configured to wipe the cleaning fluid adhering to the windshield with a wiper blade, and a remaining level sensor configured to detect an amount of the cleaning fluid remaining in a washer tank;
    an actuation notification section configured to notify a user of actuation of the foreign object removal device based on a signal output from the foreign object detector;
    a foreign object removal switch configured to enable the user to select a foreign object removal mode in which the foreign object removal device is automatically actuated to remove the foreign object detected to be present on the windshield by the foreign object detector;
    a cancel switch configured to enable the user to choose either to permit automatic actuation of the foreign object removal device when the foreign object removal mode is selected or, by actuation of the cancel switch while the foreign object removal mode is selected, cancel the automatic actuation of the foreign object removal device; and an electronic control unit configured to:
  (i) prohibit actuation of the washer device in a case in which the amount of the cleaning fluid remaining in the washer tank detected by the remaining level sensor is less than a lower limit value,
  (ii) in a case in which (a) the amount of the cleaning fluid remaining in the washer tank detected by the remaining level sensor is more than the lower limit value, and (b) the foreign object detector has detected the foreign object to be present on the windshield while the foreign object removal mode has been selected by the user having actuated the foreign object removal switch, control the actuation notification section to notify the user that the foreign object removal device will be actuated by providing an inquiry to the user as to whether or not to cancel the actuation of the foreign object removal device,
  (iii) in a case in which the actuation of the foreign object removal device is permitted by the user not actuating the cancel switch within a predetermined time period after the actuation notification section notified the user that the foreign object removal device will be actuated, control the washer device to actuate, and
  (iv) control the washer device to not actuate when the user actuates the cancel switch within the predetermined time period after the actuation notification section notified the user that the foreign object removal device will be actuated.

2. The vehicle cleaning system of claim 1, wherein:
the electronic control unit determines that the foreign object detector has detected the foreign object in a case in which a difference between a minimum pixel brightness value and a maximum pixel brightness value of pixels, of which a predetermined pixel quantity or greater exist within image data acquired by the camera, is a predetermined value or greater, or in a case in which the water droplet has been detected by the infrared sensor.

3. The vehicle cleaning system of claim 1, wherein the actuation notification section comprises at least one of:
a visual information display section including either a display or a warning light configured to notify the user of the actuation of the foreign object removal device using visual information;
an audio output section configured to notify the user of the actuation of the foreign object removal device using audio information including either an announcement or a warning sound; and
a vibration generator configured to notify the user of the actuation of the foreign object removal device using vibration.

4. The vehicle cleaning system of claim 1, wherein the washer device includes a detection range nozzle configured to spray the cleaning fluid toward a detection area of the windshield at which the foreign object detector detects the foreign object.

5. The vehicle cleaning system of claim 1, wherein:
cleaning fluid-spraying nozzles of the washer device are respectively provided at a side facing toward an upper return position and at a side facing toward a lower return position on at least one of the wiper blade or a wiper arm that causes the wiper blade to perform a wiping action; and
the electronic control unit causes spraying of the cleaning fluid from the nozzle provided at the side facing toward the upper return position during a wiping action of the wiper blade toward the upper return position, and causes spraying of the cleaning fluid from the nozzle provided at the side facing toward the lower return position during a wiping action of the wiper blade toward the lower return position.

6. The vehicle cleaning system of claim 1, wherein the wiper device includes:
a first drive source configured to swing a wiper arm so that the wiper blade coupled to a leading end portion of the wiper arm wipes the windshield;
a second drive source configured to drive an extension-contraction mechanism provided to the wiper arm to change a wiping range of the wiper blade; and
a control circuit configured to control the first drive source and the second drive source to perform an extension or contraction action of the wiper arm using the extension-contraction mechanism to correspond to a swinging action of the wiper arm.

7. The vehicle cleaning system of claim 1, wherein, in a case in which the amount of the cleaning fluid remaining in the washer tank is more than the lower limit value and is less than a predetermined value, the electronic control unit controls the actuation notification section to notify the user that the remaining amount of the cleaning fluid is low and controls the washer device to actuate.

8. The vehicle cleaning system of claim 1, wherein:
in a case in which the user actuates the cancel switch, the electronic control unit temporarily cancels the actuation of the washer device.

* * * * *